(12) United States Patent
Bailey et al.

(10) Patent No.: US 7,348,894 B2
(45) Date of Patent: Mar. 25, 2008

(54) METHOD AND APPARATUS FOR USING A DATA TELEMETRY SYSTEM OVER MULTI-CONDUCTOR WIRELINES

(75) Inventors: Jeffrey R. Bailey, Houston, TX (US); Marion M. Ringo, League City, TX (US)

(73) Assignee: Exxon Mobil Upstream Research Company, Houston, TX (US)

( * ) Notice: Subject to any disclaimer, the term of this patent is extended or adjusted under 35 U.S.C. 154(b) by 294 days.

(21) Appl. No.: 11/186,523

(22) Filed: Jul. 21, 2005

(65) Prior Publication Data

US 2005/0270172 A1    Dec. 8, 2005

Related U.S. Application Data

(63) Continuation-in-part of application No. 10/073,799, filed on Feb. 11, 2002, now Pat. No. 7,026,951.

(60) Provisional application No. 60/305,313, filed on Jul. 13, 2001.

(51) Int. Cl.
*G01V 3/00* (2006.01)

(52) U.S. Cl. .............. 340/854.3; 367/101; 367/135; 702/14

(58) Field of Classification Search ............ 340/854.3, 340/854.9; 367/101, 80, 135; 181/112; 702/14, 16, 17
See application file for complete search history.

(56) References Cited

U.S. PATENT DOCUMENTS

| | | | |
|---|---|---|---|
| 2,986,214 A | 5/1961 | Wiseman, Jr. et al. ........ 166/55 |
| 3,118,501 A | 1/1964 | Kenley ........................ 166/55 |
| 3,514,750 A | 5/1970 | Pritchett et al. ............. 340/18 |
| 3,603,923 A | 9/1971 | Nelligan | |
| 3,662,833 A | 5/1972 | Kisling, III ................ 166/314 |
| 3,982,841 A | 9/1976 | Endzweig | |
| 3,988,712 A * | 10/1976 | Ezell et al. ................... 367/80 |
| 4,102,401 A | 7/1978 | Erbstoesser ................ 166/284 |
| 4,113,314 A | 9/1978 | Savanick et al. ............. 299/4 |
| 4,244,425 A | 1/1981 | Erbstoesser et al. ........ 166/284 |
| 4,415,895 A | 11/1983 | Flagg ........................ 340/856 |

(Continued)

FOREIGN PATENT DOCUMENTS

CA     2044877     12/1991

(Continued)

OTHER PUBLICATIONS

Davis, C. et al (1988) "Fiber-Optic Sensors for Geophysical Applications", *SPIE—Fiber Optic and Laser Sensors VI*, vol. 985, pp. 26-32.

(Continued)

*Primary Examiner*—Timothy Edwards, Jr.

(57) ABSTRACT

A data telemetry system for multi-conductor wirelines to enhance transmission of analog and digital signals with frequency content up to 100 kHz by assigning at least two conductors to a first terminal of a data transmittal means and to a first terminal of a data receiver means and connecting at least one additional conductor to a second terminal of a data transmittal means and to a second terminal of a data receiver means. Pairing conductors reduces attenuation and crosstalk and permits the signal to contain multiple frequency modulated carrier bands with individual channel bandwidths of up to 3 kHz or higher.

19 Claims, 15 Drawing Sheets

U.S. PATENT DOCUMENTS

| | | | |
|---|---|---|---|
| 4,428,422 A | 1/1984 | Laurent | 166/212 |
| 4,637,468 A | 1/1987 | Derrick | 166/297 |
| 4,646,083 A | 2/1987 | Woods | 340/856 |
| 4,671,352 A | 6/1987 | Magee, Jr. et al. | 166/186 |
| 4,686,653 A | 8/1987 | Staron et al. | 367/25 |
| 4,702,316 A | 10/1987 | Chung et al. | 166/272 |
| 4,706,224 A | 11/1987 | Alford | 367/41 |
| 4,776,393 A | 10/1988 | Forehand et al. | 166/55 |
| 4,796,026 A | 1/1989 | Hammond | 340/857 |
| 4,809,781 A | 3/1989 | Hoefner | 166/273 |
| 4,855,732 A | 8/1989 | Cretin et al. | 340/856 |
| 4,870,580 A | 9/1989 | Lang et al. | 702/14 |
| 4,881,207 A | 11/1989 | Dubesset et al. | 367/31 |
| 4,888,740 A | 12/1989 | Brie et al. | 367/30 |
| 4,891,641 A | 1/1990 | Gard et al. | 340/857 |
| 4,910,718 A | 3/1990 | Horn | 367/124 |
| 4,992,994 A | 2/1991 | Rambow et al. | 367/25 |
| 5,010,527 A | 4/1991 | Mahrer | 367/86 |
| 5,016,727 A | 5/1991 | Wittrisch | |
| 5,044,461 A | 9/1991 | Aronstam | 181/102 |
| 5,060,751 A | 10/1991 | Kuhlman et al. | 181/102 |
| 5,062,084 A | 10/1991 | Schoepf et al. | 367/13 |
| 5,111,903 A | 5/1992 | Meynier | 181/102 |
| 5,172,480 A | 12/1992 | Labuc et al. | 33/304 |
| 5,189,262 A | 2/1993 | Engler et al. | 181/102 |
| 5,212,354 A | 5/1993 | Miller et al. | 181/108 |
| 5,231,252 A | 7/1993 | Sansone | 181/122 |
| H1232 H | 9/1993 | DiSiena | 367/57 |
| 5,243,337 A | 9/1993 | Beauducel et al. | 340/855.3 |
| 5,243,544 A | 9/1993 | Schoess | 364/566 |
| 5,253,219 A | 10/1993 | Houston et al. | 367/79 |
| 5,290,159 A | 3/1994 | Miller et al. | 417/521 |
| 5,309,995 A | 5/1994 | Gonzalez et al. | 166/284 |
| 5,314,019 A | 5/1994 | Honarpour | 166/270 |
| 5,353,875 A | 10/1994 | Schultz et al. | 166/297 |
| 5,363,094 A | 11/1994 | Staron et al. | 340/854 |
| 5,370,545 A | 12/1994 | Laurent | 439/190 |
| 5,387,907 A | 2/1995 | Gardner et al. | 340/854.9 |
| 5,475,187 A | 12/1995 | Omnes | 181/102 |
| 5,481,502 A | 1/1996 | Cretin et al. | 367/77 |
| 5,485,882 A | 1/1996 | Bailey et al. | 166/284 |
| 5,495,483 A | 2/1996 | Grube et al. | 370/95.1 |
| 5,503,225 A | 4/1996 | Withers | |
| 5,504,479 A | 4/1996 | Doyle et al. | 340/854.9 |
| 5,513,703 A | 5/1996 | Mills et al. | 166/55 |
| 5,550,785 A | 8/1996 | Laurent et al. | 367/25 |
| 5,579,844 A | 12/1996 | Rebardi et al. | 166/296 |
| 5,594,706 A | 1/1997 | Shenoy et al. | 367/76 |
| 5,747,750 A | 5/1998 | Bailey et al. | 181/112 |
| 5,771,170 A | 6/1998 | Withers et al. | |
| 5,803,178 A | 9/1998 | Cain | 166/306 |
| 5,865,252 A | 2/1999 | van Petegem et al. | 166/297 |
| 5,890,536 A | 4/1999 | Nierode | 166/284 |
| 5,917,160 A | 6/1999 | Bailey | 181/112 |
| 5,934,377 A | 8/1999 | Savage | 166/281 |
| 5,954,133 A | 9/1999 | Ross | 166/297 |
| 5,996,687 A | 12/1999 | Pringle et al. | 166/66 |
| 6,172,994 B1 | 1/2001 | Schaffner et al. | 370/529 |
| 6,186,230 B1 | 2/2001 | Nierode | 166/250 |
| 6,189,621 B1 | 2/2001 | Vail, III | 166/385 |
| 6,257,332 B1 | 7/2001 | Vidrine et al. | 166/250 |
| 6,296,066 B1 | 10/2001 | Terry et al. | 175/92 |
| 6,369,718 B1 | 4/2002 | Mathieu | 340/853.7 |
| 6,396,415 B1 | 5/2002 | Bulmer | 340/855.8 |
| 6,473,616 B1 | 10/2002 | Sydor | 455/446 |
| 6,488,116 B2 | 12/2002 | Bailey et al. | 181/108 |
| 6,552,665 B1 | 4/2003 | Miyamae et al. | 340/854.9 |

| | | |
|---|---|---|
| 2003/0011490 A1 | 1/2003 | Bailey et al. |

FOREIGN PATENT DOCUMENTS

| | | |
|---|---|---|
| EP | 0 082 524 | 6/1983 |
| EP | 0 138 271 | 5/1984 |
| GB | 2 230 091 | 10/1990 |
| GB | 2275337 | 8/1994 |
| GB | 2 292 802 A | 3/1996 |
| GB | 2409722 | 7/2005 |
| WO | WO93/08485 | 4/1993 |
| WO | WO 01/49001 A1 | 7/2001 |

OTHER PUBLICATIONS

Dobecki, T. L., (1983) "Hydraulic Fracture Orientation Using Passive Borehole Seismics," *Society of Petroleum Engineers*, No. 12110.

Engi, D. (1989) "A Spherical-Stochastic Methodology for Microseismic Event Location", *Computers & Geosciences*, vol. 15, No. 7, pp. 1037-1052.

Hartenberger, R. A. et al. (1970) "Influence of Number and Spacing of Sensors on the Effectiveness of Seismic Arrays", *32nd Meeting of the European Association of Exploration Geophysicists*, Edinburgh, pp. 771-784.

Ilderton, David C. et al., (1993) "Microseismic Imaging of Hydrofractures with the Aid of Conical Wgaves," *63rd SEG Meeting*, pp. 267-270.

Kirichenko, Oleg V. et al. (1993) "Fiber-Optic Sensors for Vibration Registration by means of Interferometry and Speckle-Interferometry Methods", *SPIE—Fiber Optic and Laser Sensors XI*, vol. 2070, pp. 409-415.

Lacy, L. L., (1984) "Comparison of Hydraulic-Fracture Orientation Techniques,"*Society of Petroleum Engineers*, pp. 322-332.

Li, Y. G. et al. (1988) "Stress Orientation Inferred from Shear Wave Splitting in Basement Rock at Cajon Pass", *Geophysical Research Letter*, vol. 15, No. 9, Paper No. 8L7356, pp. 997-1000.

Mari, J. L. et al. (1989) "Well Seismic Part One: The Vertical Seismic Profile, Basic Principles, Applications and Implementation", *1142 Revue de L'Institut Francais du Petrole*, 44, No. 2, Paris, France, 35 pages of translation.

Mykkeltveit, S. et al (1984) "Processing of Regional Seismic Events using Data from Small-Aperture Arrays", *Bulletin of the Seismological Society of America*, vol. 74, No. 6, pp. 2313-2333.

Pechstedt, R. D. et al (1993) "Optical Fibre Accelerometers for High Temperature Applications", SPIE—Fiber Optic and Laser Sensors XI, vol. 2070, pp. 352-359.

Schlumberger Oilfield Review, pp. 10-14, Jan. 1994.

Schmidt, M. et al (1989) "A Digitally-Controlled Broad-Band Seismometer", *Gerlands Beitr. Gophysik, Leipzip* 98 1, S. pp. 84-87.

Sleefe, G. E., et al., (1993) "Observations of Broad-Band Micro-Seisms During Resevoir Stimulation", *63rd SEG Meeting*, Washington.

Sleefe, G.E., et al., (1991) "Experimental Study of an Advanced Three-Component Borehole Seismic Receiver," 1991, *61st SEG Meeting*, Houston, Texas.

Sleefe, G.E., et al., (1993) "Rapid Acquisition of High Resolution Full Wavefield Borehole Seismic Data" *Soc. of Exploration Geophysicist*, 63rd Annual Mtg., Washington, DC, 7 pages).

Stewart, L., et al. (1992) "Acoustic-Emission Monitoring During Hydraulic Fracturing," Society of Petroleum Engineers Formation Evaluation, pp. 139-144, 1992.

Thorne, B.J. et al (1988) "An Assessment of Borehole Seismic Fracture Diagnostics", *SPE 63rd Annual Technical Conference*, Houston, TX, Paper No. 3, (Oct. 22-5 1988) pp. 123-131.

Warpinski, N. R. et al. (1995) "Microseismic Mapping of Hydraulic Fractures Using Multi-Level Wireline Receivers", SPE 30507, Dallas, Texas, pp. 579-589.

"Assessment of Borehole Seismic Fracture" *National Technical Information Service*, (1988) 11 pgs.

Corresponding PCT Application No. PCT/US02/15070, Written Opinion dated Apr. 30, 2003.

Corresponding PCT Application No. PCT/US02/15070, Int'l Search Report dated Jun. 25, 2002.

Barry, W. & Omnes, G., "Multi-level Geophone Tool Strings Improve Well Seismic Projects", Oil & Gas Journal, Jan. 14, 1991, pp. 73-75.

Kiowski, J.W., "In-Field Quality Control of VSP Data", Oil & Gas Journal, Feb. 23, 1987, pp. 71-75.

Peterson, R.E. et al., "Application of Microseismic Technology to Hydraulic Fracture Diagnostics: GRI-DOE Field Fracturing Multi-Sites Project Report", Jul. 28, 1993 to Jul. 27, 1996, pp. 595-614.

PCT International Search Report and Written Opinion, mailed Apr. 2, 2007, 7 pages.

* cited by examiner

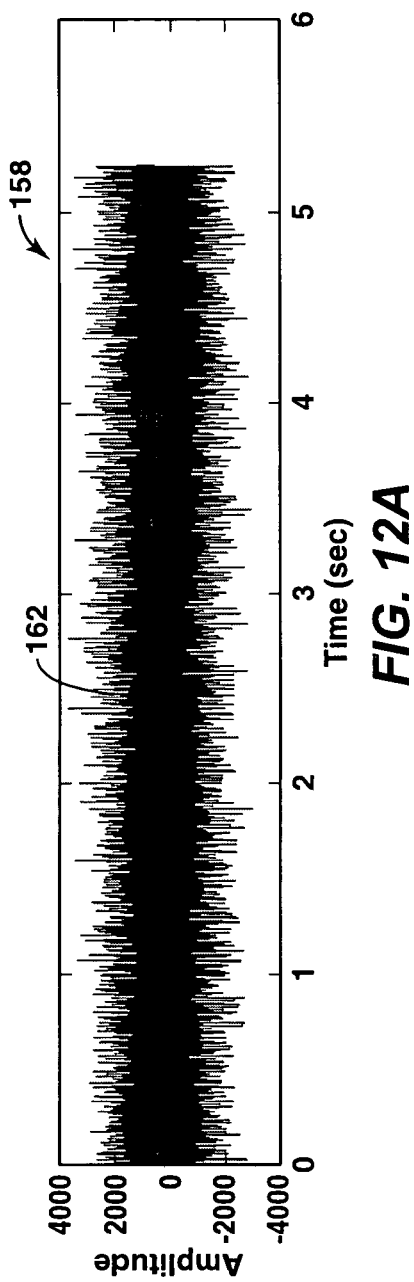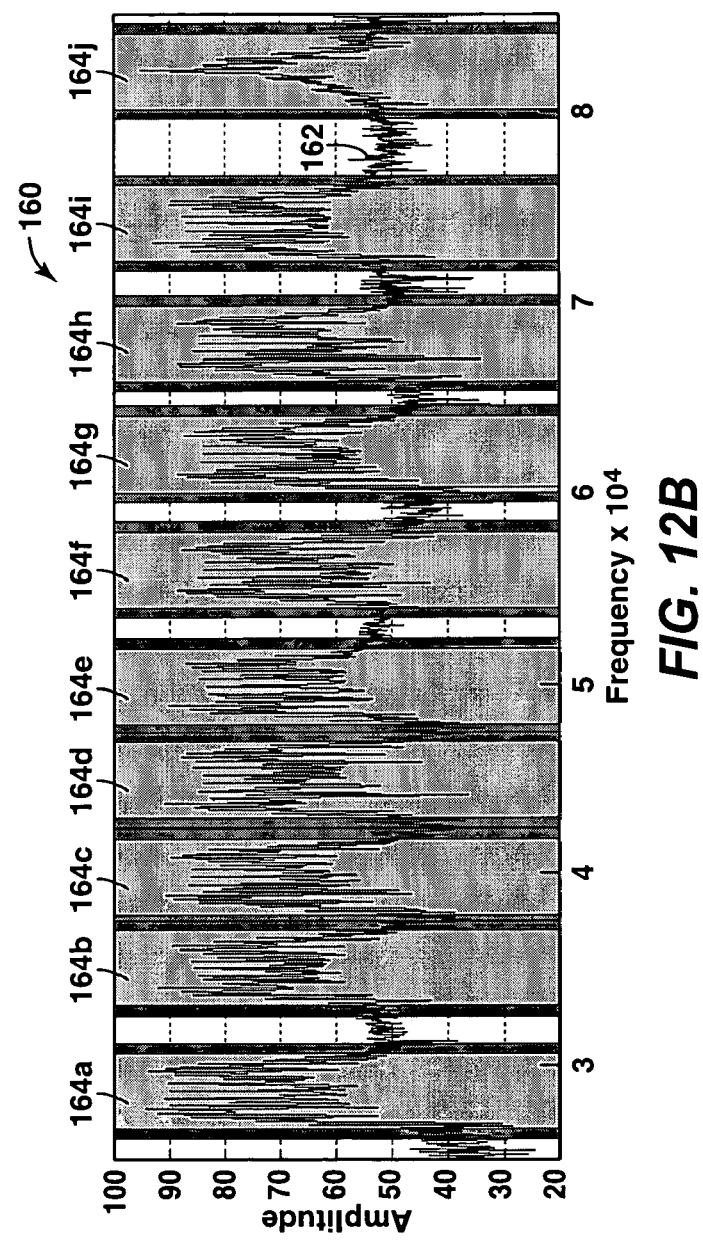

METHOD AND APPARATUS FOR USING A DATA TELEMETRY SYSTEM OVER MULTI-CONDUCTOR WIRELINES

RELATED U.S. APPLICATION DATA

This application is a continuation-in-part of U.S. application Ser. No. 10/073,799 filed Feb. 11, 2002, now U.S. Pat. No. 7,026,951 which claimed priority to U.S. Provisional No. 60/305,313, filed Jul. 13, 2001.

FIELD OF THE INVENTION

This invention relates generally to the field of wireline data telemetry. Specifically, the invention is a method and system for data telemetry using a multi-conductor wireline for well operations related to the production of hydrocarbons.

BACKGROUND OF THE INVENTION

A multi-conductor wireline with integral electrical conductors is often used in the oil and gas industry to physically transport a logging tool downhole and to transmit data between a downhole tool and a surface station. Generally, most of the data transfer involves sending data from the tool to recording equipment located on the surface, but certain applications require sending data down to the tool from the surface. The wireline may have from one to seven or more separate electrical conductors, typically composed of copper, depending on the requirements of the application. These conductors have electrical insulation and are wrapped in helical strands of high-strength armor, which are typically made of steel. In the particular case of seven-strand wireline cable, there is a single insulated inner conductor wrapped by a helix of six insulated conductors, overlaid by two layers of inner and outer armor strands that are wrapped in opposing directions. In many applications, each conductor is assigned to a single dedicated analog or digital signal. Typical dimensions are about 0.04-inch (1 mm) for the diameter of each conductor and up to 30,000 ft (9146 m) for the length of the wireline, although variations from these typical values are common.

Electrically, the wireline cable acts as a distributed low-pass filter with frequency-dependent coupling, displaying a complex impedance characteristic with mutual impedance between conductors. A signal transmitted on any given channel (consisting of a voltage difference between two terminals) is subjected to attenuation (or reduction in signal amplitude) between the input signal and the output signal. This attenuation typically increases with frequency and is a result of "self-impedance." Self impedance is the resistance, capacitance and inductance of an individual conductor. Also, transmitting a signal on one set of conductive paths generates a corresponding signal on other paths by the existence of "mutual impedance" that results from capacitive and inductive coupling between the conductors. This coupling is known as crosstalk. Typically, for transmission systems such as a conventional multi-conductor wireline, the amplitude of the induced crosstalk signal increases with the frequency of the input signal.

As more fully described in U.S. Pat. Nos. 5,747,750 and 5,917,160 (Bailey, et al), a method has been developed to extend the usefulness of this conventional wireline to a greater number of data signals and to increase the maximum frequency bandwidth of these signals. In particular, this method was designed for use with a Triaxial Borehole Seismic (TABS) downhole logging tool to record microseismic acoustic data that are emitted by formations after fluids injection at fracturing rates. The TABS fracture mapping technology uses a relatively inexpensive, reusable, clamped logging tool and specialized data analysis methods to locate microseismic events. The induced fracture geometry may be inferred from maps composed of collections of such event source locations. Fracture azimuth, length, height, and orientation (vertical or horizontal) may be estimated from this data. Such data may be critical for optimizing the field development plan of a fracture stimulated reservoir.

Modern logging tools (e.g., TABS) are capable of producing large quantities of information characterizing subsurface formations. This information must be communicated or transmitted to the surface so that it may be utilized (e.g., to locate underground oil deposits or identify fracture propagation geometry). Data telemetry is no simple task since the number of signals to be transmitted may exceed the number of conductors, hereinafter referred to as "telemetric conductors," available in the wireline. Moreover, signal attenuation and frequency-dependent crosstalk commonly occur at higher frequencies in the data telemetry process, limiting the signal bandwidth.

Multi-channel frequency-modulated (FM) telemetry as described in the Bailey et al. patents was developed for the first generation of the TABS tool. Signal transmission by frequency modulation is preferred to amplitude modulation because the signal amplitude is significantly attenuated along the wireline, but the signal frequencies are preserved. At the surface data recorder, each frequency can be selected and demodulated to recover a facsimile of the original signal. In the prior art TABS system, seven channels of seismic data are transmitted on FM signals over four conductors, leaving three conductors for other uses. Data that is transmitted on these wire pairs have a bandwidth that begins to roll off significantly at 20 kHz (depending on the specific wireline configuration), limiting signal detectability at higher frequencies. Appropriate frequency spacing between channels is required for proper signal separation, and the overall design constraints force the use of lower frequency carrier channels that impose an overall bandwidth limit of about 500 Hz on the modulating and recovered signals.

U.S. Pat. No. 4,796,026 (Hammond) proposes a piezoelectric transducer for noise logging applications. Downhole circuitry is used to convert the noise signal amplitude to a variable pulse rate, similar to a voltage-to-frequency conversion process. In this reference, there is no discussion of transmission of downhole signals to the surface over multiple conductors.

In U.S. Pat. No. 3,514,750 (Pritchett), a multiple conductor encoding scheme for transmission of digitized signals is described. To mitigate the effects of wireline impedance coupling, signals of opposite polarity are transmitted simultaneously on alternate conductors. Encoding methods for 3, 4, 6, and 7 conductors are disclosed.

U.S. Pat. No. 5,062,084 (Schoepf) specifies a system for operating a downhole-digitizing acoustic tool on seven conductor wireline. Two conductors provide power, and the remaining cables provide digital data telemetry, including downlink communication in addition to the uplink data transfer. The system has distinct recording and transmitting modes. Therefore, Schoepfs downhole digitizing acoustic tool cannot provide full real-time data telemetry.

U.S. Pat. No. 4,646,083 (Woods) describes a system by which an analog signal is transmitted on a FM channel over a pair of wires. The frequency is not defined in the claims, but a value of 15 kHz is cited in the preamble. This signal is the summation of two square waves with frequencies that are proportional to two DC values, such as temperature and pressure. This reference does not consider the use of additional conductors or the assignment of conductors to particular signals to mitigate wireline impedance.

U.S. Pat. No. 4,891,641 (Gard) describes the use of a single channel FM telemetry system to transmit a signal comprised of frequencies beyond the bandwidth of the wireline system. In particular, Gard describes a method to facilitate transmission of signals with higher frequencies on a lower frequency carrier signal because 30 kHz is cited as being the practical limit for data telemetry on wireline. The data is then reconstructed at the surface using standard demodulation techniques and commercially-available equipment.

Other attempts to address wireline telemetry have been based on digital transmission and encoding techniques that utilize different types of cables, such as fiber optic cables. Also, other attempts have focused on low frequency transmissions, data buffering and avoiding simultaneous transmission of multiple signals.

Accordingly, there is a need for improved data telemetry methods and apparatus for data-intensive real-time tools whereby analog or digital signals of up to 100 kHz can be transmitted uphole using conventional wireline systems that are available worldwide. This transmitted signal may contain data from multiple devices, each of which may have signal bandwidths up to 3 kHz or higher. Further, the system may be capable of transmitting a large number of signals that exceed the number of conductor pairs available on the wireline.

SUMMARY OF THE INVENTION

In one embodiment, the present invention is a method to achieve a favorable reduction in attenuation and crosstalk transmission characteristics on a wireline having at least three telemetric conductors. This method comprises (a) connecting one end of the wireline to a data transmittal means at the first location and the other end of the wireline to a data receiver means at the second location, the data transmittal means having first and second output terminals, the data receiver means having first and second input terminals, wherein (1) at least two of the conductors are connected to the first output terminal of the data transmittal means and to the first input terminal of the data receiver means, and (2) at least one of the conductors is connected to the second output terminal of the data transmittal means and to the second input terminal of the data receiver means; (b) generating the data signal at the first location; (c) transmitting the data signal from the data transmittal means through the wireline to the data receiver means; and (d) receiving the data signal at the second location.

A second embodiment includes a method for communicating with a device within a wellbore. The method includes receiving amplitude-modulated data from one or more devices in the wellbore. This amplitude-modulated data is used to modulate channel signals at various frequencies, wherein the frequency range includes frequencies from a lowest frequency to a highest frequency. The highest frequency being below the first harmonic of the lowest frequency that interferes with the highest frequency. Then, the method includes summing the channel signals into a composite modulated signal. Finally, the method includes transmitting a single composite modulated signal to a receiver at the surface.

A third embodiment includes a system for operating a device within a wellbore. The device is configured to receive amplitude-modulated data signals; modulate channel signals at various frequencies, wherein the frequency range includes frequencies from a lowest frequency to a highest frequency that is below the first harmonic of the lowest frequency; and then sum the channel signals into a single composite modulated signal. Also, the system includes surface equipment coupled to the device via wireline. The surface equipment is configured to receive the composite modulated signal and demodulate this signal into amplitude-modulated channel signals.

In a fourth embodiment, the method and apparatus may include auxiliary digital signals operating at higher frequencies than the first significant harmonic of the lowest frequency band, such data being amenable to reconstruction without error in the presence of interference from the lower-amplitude harmonics of lower frequencies.

In a final embodiment, the downhole circuitry includes compact electronic circuitry in which chip die are mounted on circuit board or alumina substrates and enclosed in a small container that is back-filled with inert gas. These "hybridized" systems may provide enhanced performance, longevity, and temperature-resistance.

BRIEF DESCRIPTION OF THE DRAWINGS

The present invention and its advantages will be better understood by referring to the following detailed description and the attached drawings in which:

FIGS. 12A and 12B are exemplary charts of a modulated signal from the system of FIG. 10 in accordance with aspects of the present techniques;

DETAILED DESCRIPTION OF THE PREFERRED EMBODIMENTS

In the following detailed description, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

Conventional multi-strand wirelines that are widely available in the oilfield often have seven conductors. This is commonly known as "open-hole wireline" because it is generally used for formation evaluation logging tools. However, it may also be used for certain cased-hole logging tools. The number of strands typically limits the number of channels of data that may be transmitted to the surface. Since electrical power is usually required, often there are no more than six available data channels. The frequency bandwidth that may be transmitted is also limited, since frequencies in excess of 20 kHz are often severely attenuated and the transfer function (relationship of input and output of the system) becomes more irregular. The electrical impedance of long wirelines (often in excess of 20,000 ft) tends to limit the upper frequency bandwidth of these data because of signal attenuation and crosstalk.

Figure 1:
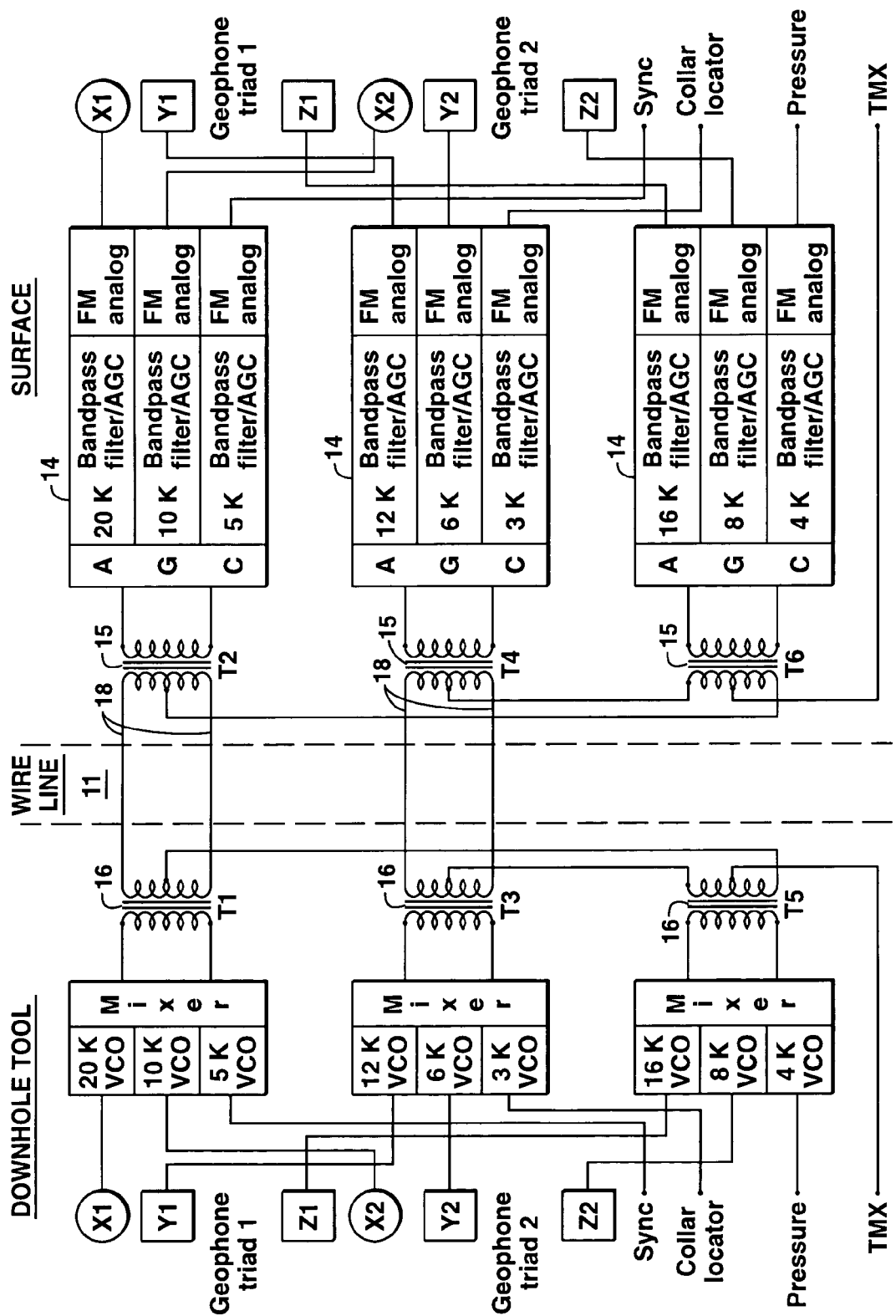
FIG. 1 is a schematic illustration of the prior art TABS tool data telemetry configuration, as described in U.S. Pat. Nos. 5,747,750 and 5,917,160.
Figure 2:
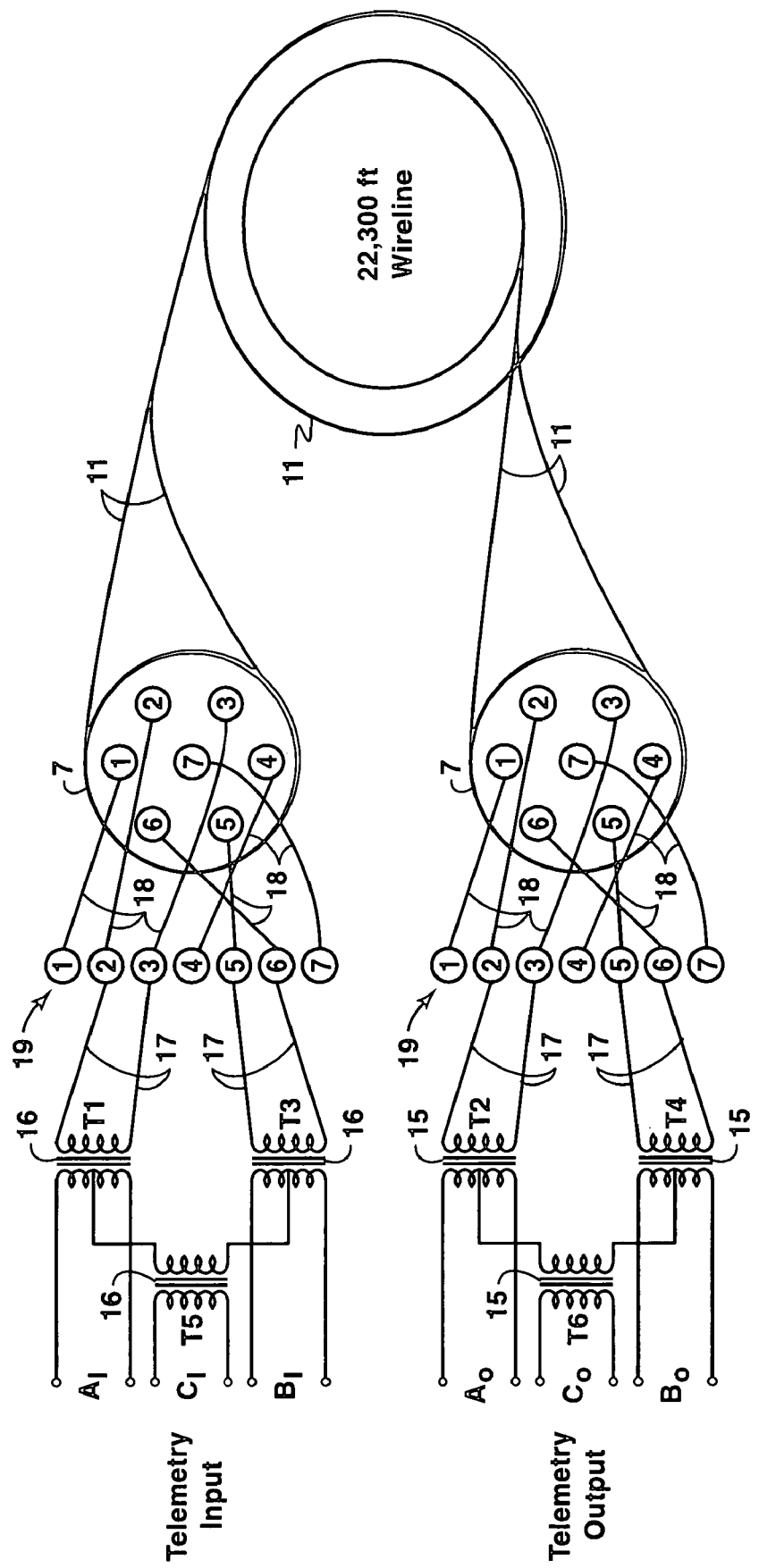
FIG. 2 is a schematic illustration of the test evaluation configuration to characterize the prior art TABS tool data telemetry method.

FIGS. 1 and 2 illustrate the current TABS tool telemetry configuration, showing the use of four conductors 18 within wireline 11 to transmit data on nine FM channels at carrier frequencies from 3 to 20 kHz. The transformers 15 and 16 (T1 through T6) are all identical devices. Transformers T1 and T3 are each connected across pairs of wireline conductors 18 at the downhole tool. These conductors 18 are connected to transformers T2 and T4, respectively, at the surface. Transformers T5 and T6 each have one lead connected to the centertap lead of the other two transformers (i.e. T5 is connected across the centertaps of T1 and T3 at the downhole tool, and similarly, T6 is connected across T2 and T4 at the surface).

The input (downhole) transformers 16 are arranged as 7:1 step-down transformers at the input end to the wireline 11 and 1:7 step-up output transformers 15 at the receiver end. It is desirable to reduce the voltage and increase the current of the signal to propagate the signal on the wireline with lower losses. The particular transformer designed and built for this application is fabricated on a 2616 core, consisting of a primary coil and secondary bifilar windings on a bobbin of 26 mm diameter and 16 mm height. The wire used is known as "magnet wire" and is typically 28 to 32 gauge wire with enamel insulation. The transformer efficiency is in the range of 95% to 98%.

The downhole tool and surface equipment, as shown in FIG. 1, are known in the art (i.e., U.S. Pat. Nos. 5,747,750 and 5,917,160). The downhole tool and surface equipment can be modified to use the new telemetry method described herein. Therefore, the improved method for data telemetry can provide improved transfer of data between the downhole tool and the surface equipment.

In the prior method, the signal fed into each downhole transformer 16 consists of the summation of three FM signals. For example, the 5, 10, and 20 kHz channels are summed and input to T1, the 3, 6, and 12 kHz channels are summed and input to T3, and the 4, 8, and 16 kHz channels are summed and input to T5. In general, a longer wireline length has greater attenuation at higher frequencies. In the absence of wireline crosstalk, the signal received at T2 would be that input to T1, only with frequency-dependent amplitude attenuation that depends on the wireline length and impedance. By design, this would relax the filter design parameters necessary to recover the individual 5, 10, and 20 kHz channels. However, with the conductor assignments shown in FIGS. 1 and 2, depending on the wireline 11 length and specific configuration, these signals couple into the signals on the T3-T4 and T5-T6 pairs of transformers. Therefore, it was necessary to design the banks of bandpass filters 14 at the surface unit to reject all frequencies except the desired signal frequency.

FIG. 2 schematically illustrates the test configuration on a 22,300 foot wireline 11 to evaluate the prior art TABS tool data telemetry method. The wireline 11 includes seven conductors numbered 1 through 7. Each conductor, except for the center conductor 7, is crosswise-paired or opposite to another conductor when the wireline 11 is cut perpendicularly. In the prior art data telemetry method there are three input data signals ($A_I$, $B_I$, and $C_I$) with the corresponding output data signals ($A_o$, $B_o$, and $C_o$). Output terminals from T1 and T3 are connected or tied electrically by wire connections 17 to a terminal strip 19 which is then electrically connected by wire connections 18 to the individual conductors of a seven conductor wireline 11. Corresponding connections are made on the output side at T2 and T4.

Figure 3:
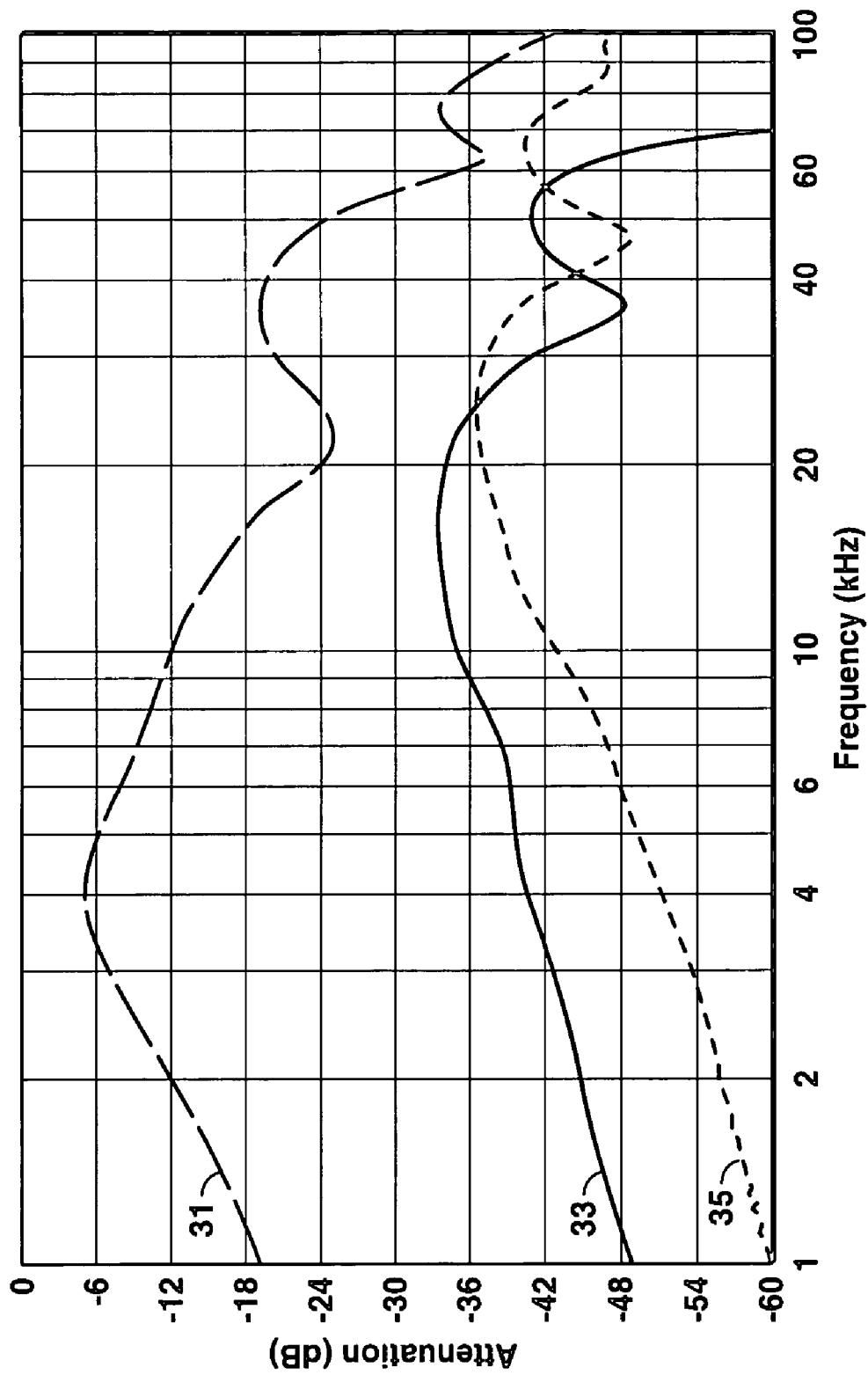
FIG. 3 illustrates the test evaluation results for the prior art method, showing the telemetry system input-output frequency response, including both self-impedance and mutual impedance effects.

FIG. 3 characterizes the effects of attenuation on one leg of a system configured as shown in FIGS. 1 and 2 operating on a 22,300 ft wireline. For the specific wireline impedance of this example, the response reaches a peak value of −5 dB at 4 kHz. The nondimensional unit of the decibel (dB) is used commonly in signal processing. It is a logarithmic transform such that the value in dB is equal to 20 times the log of the amplitude ratio. Thus, each 6 dB of attenuation corresponds to an amplitude reduction of a factor of two, and additive amounts on the decibel scale are multiplicative on a linear scale. Therefore, an attenuation of 6 dB corresponds to an amplitude reduction of a factor of 2; attenuation of 12 dB corresponds to an amplitude ratio of 4; attenuation of 18 dB is an amplitude ratio of 8; 24 dB is a ratio of 16; 30 dB of attenuation is a ratio of 32; 36 dB is a reduction factor of 64.

The frequency response 31 declines from −12 dB at 10 kHz to −24 dB at 20 kHz, varies between −20 to −24 dB to about 50 kHz, and then falls from −24 dB at 50 kHz to −42 dB at 100 kHz. The variable peaks and valleys in the response make compensation filtering difficult, particularly in that these specific deviations will vary with wireline length and other specific factors that are individual to each unit and will thus be subject to significant variability in a field environment.

The crosstalk that results from mutual impedance between conductors is also illustrated in FIG. 3. The lower response curves correspond to signals measured on two other conductor pairs (1 & 4) 33 and (5 & 6) 35 that result from transmission of a signal on the original conductor pair (2 & 3) 31. Beyond about 60 kHz, the signals on the conductor pairs (1 & 4) 33 and (5 & 6) 35 are nearly as strong as the transmitted signal (2 & 3) 31.

These characteristics pose difficulty in signal reconstruction, both because of the amount of gain required to recover the mean downhole signal amplitude and the variability of the response at different frequencies within the desired bandwidth of 10 to 100 kHz. Experience with the system designed and built according to FIGS. 1 and 2 has shown that the lower frequency channels are marginally acceptable for seismic data transmission, with amplitude and phase response that are inferior to the channels above 10 kHz. The carrier frequency should be at least ten times the frequency of the desired input signal bandwidth for high fidelity reconstruction.

According to the present invention, the limitations imposed on downhole data telemetry to the surface are reduced by increasing the number of transmitted channels and by utilization of higher frequency carrier channels than can be normally transmitted on conventional seven-strand wireline cable. Specifically, the telemetry method of the present invention increases the number of available channels and increases the transmitted data bandwidth relative to the system described in FIGS. 1, 2, and 3.

One embodiment is to use carrier frequencies at successive multiples of each other. To avoid excessive filtering, successive frequencies should be at least a multiple of 1.1 (e.g., 10, 11, 12.1, 13.3 . . . kHz). Furthermore, to fit a favorable number of channels, the multiple should not be more than 10 (e.g., 1, 10, 100 kHz). A preferred embodiment is to choose a multiple of about 1.25 starting at about 15 kHz. The selection of a group consisting of 14.9, 18.7, 23.3, 29.2, 36.5, 45.5, 57.0, 71.2, 89.0 kHz is one such choice. Another embodiment is to choose carrier frequencies that are prime numbers. Use of prime numbers for the carrier frequency can limit harmonic interference or overlap. Harmonic interference is when any integral multiple of a carrier frequency falls within a bandwidth of another carrier frequency.

Figure 4:
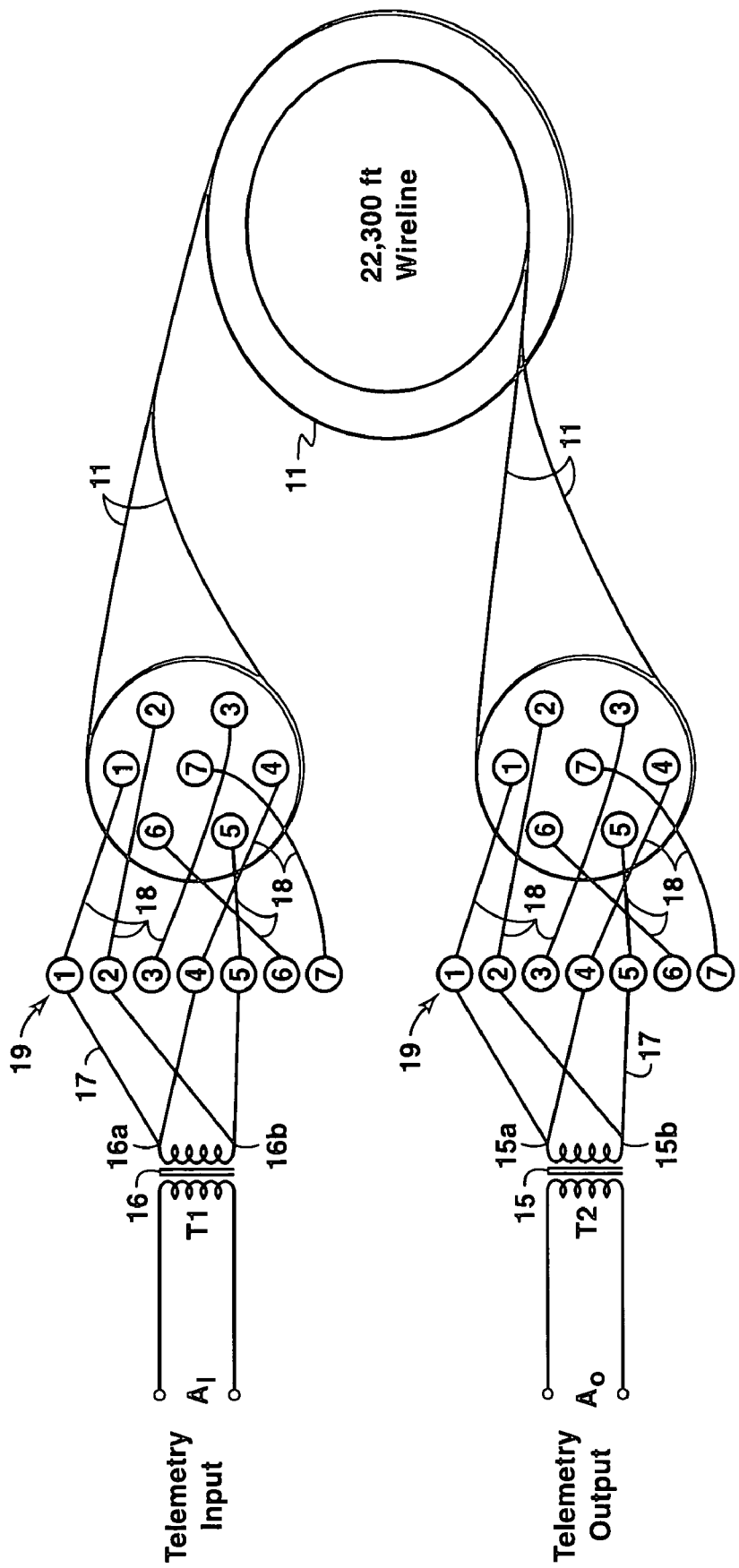
FIG. 4 is a schematic illustration of the test configuration of one embodiment of the present invention, illustrating the method of pairing opposing wires on two terminals.

FIG. 4 is a schematic that illustrates one embodiment of the invention and the test configuration that was used to evaluate the invention. An input signal consisting of a swept sine wave was applied to the "Telemetry Input," and the output signal was received at the "Telemetry Output." The signal was transmitted through a 22,300 foot wireline. A modern electronic instrument, such as a Stanford Research Systems SRS785 spectrum analyzer, may be used to provide the input signal and to process/display the output signal.

For the embodiment illustrated in FIG. 4, one terminal of each transformer (terminals 15a and 16a) is tied to conductors 1 & 4, and the other terminals (15b and 16b) are connected to conductors 2 & 5. It should be noted that conductors 1 & 4 and conductors 2 & 5 are crosswise-paired or "opposing pairs." Other examples of wireline configurations of groups of two opposite or crosswise-paired conductors include the groups consisting of the following conductors: 1 & 4 and 2 & 5, 1 & 4 and 3 & 6, 2 & 5 and 1 & 4, 2 & 5 and 3 & 6, 3 & 6 and 2 & 5, 3 & 6 and 1 & 4.

This means that conductor 4 is located on the opposite side of wireline 11 from conductor 1 and, similarly, conductor 5 is opposite conductor 2. The selection of specific pairs is arbitrary, so long as each conductor wire is tied to the opposing wire (pairing with opposite conductors). There was improvement in the frequency response for alternative arrangements, such as connecting one terminal to conductors 1 & 2 and the other terminal to 4 & 5, but these alternatives were found to be inferior to using opposing pairs.

Figure 5:
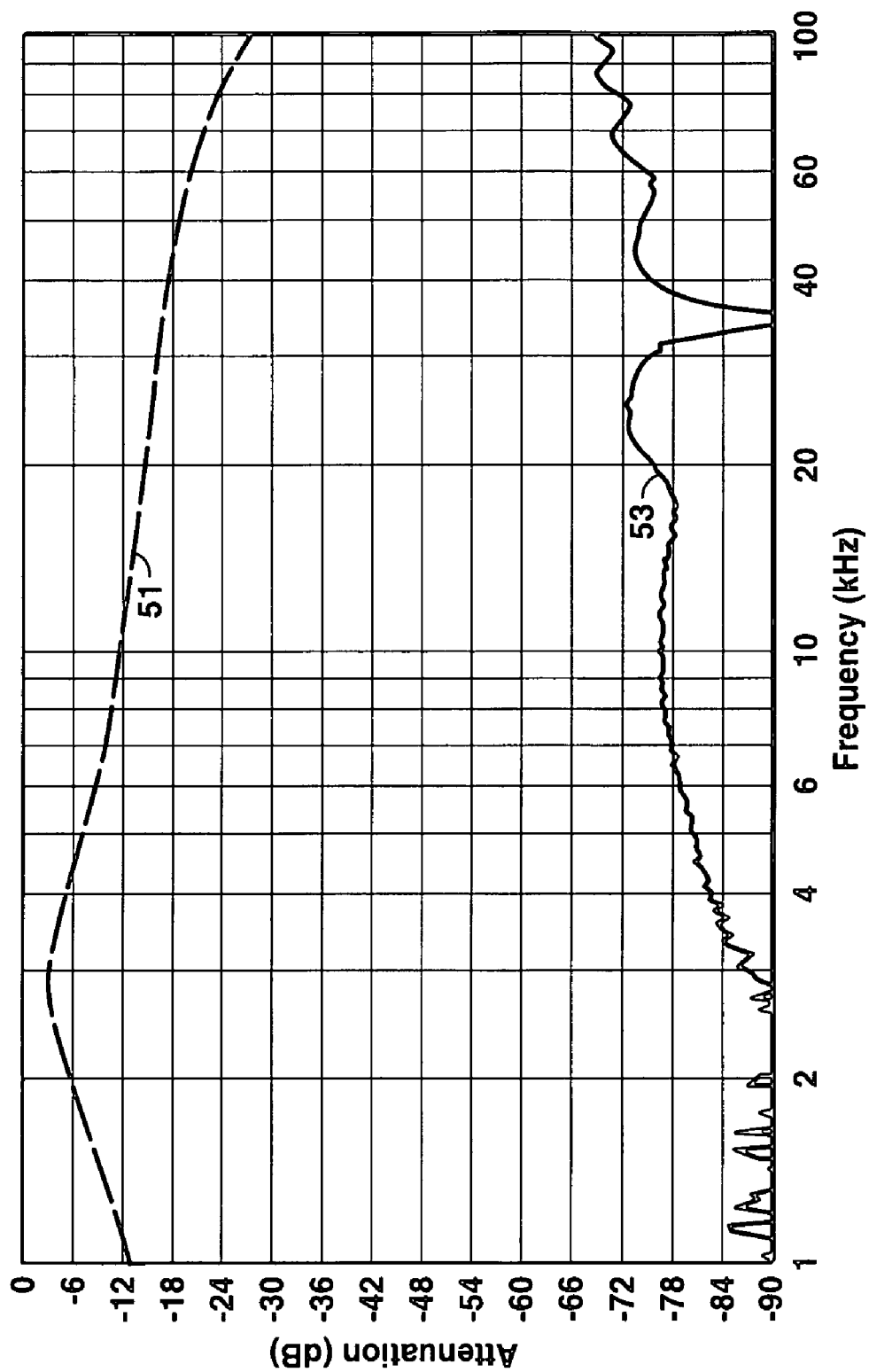
FIG. 5 illustrates the test evaluation results for the inventive method, for the specific embodiment of FIG. 4.

FIG. 5 illustrates the frequency response for the embodiment shown in FIG. 4 (pairing conductors 1 & 4 and 2 & 5) 51. The peak response 51 is −4 dB at 3 kHz, with a smooth and gradual decline to −27 dB at 100 kHz. Over the frequency range from 10 to 100 kHz, only 15 dB of attenuation is observed, indicating a steady response characteristic with no drastic attenuation changes. This is a significant improvement to the response seen in FIG. 3, in which a 30 dB decline is seen in a very uneven fashion from 10 kHz to 100 kHz. Note that a decline of 15 dB is a factor of 5.6 reduction in signal amplitude, whereas a 30 dB decline corresponds to a factor of 32 reduction in signal strength. A compensation filter for the system of FIG. 5 is far more readily obtained, because there are no peaks and valleys and also because the reduction in attenuation will increase the signal-to-noise ratio significantly.

Also shown in FIG. 5 is the frequency response 53 of the signal induced on the 3 & 6 conductor pair while transmitting on the 1 & 4 and 2 & 5 conductor pairs. The scale of the graph had to be modified to show this response, because the amplitude is less than −70 dB over the entire frequency range. Therefore, this system has very low crosstalk onto other conductors.

Figure 6:
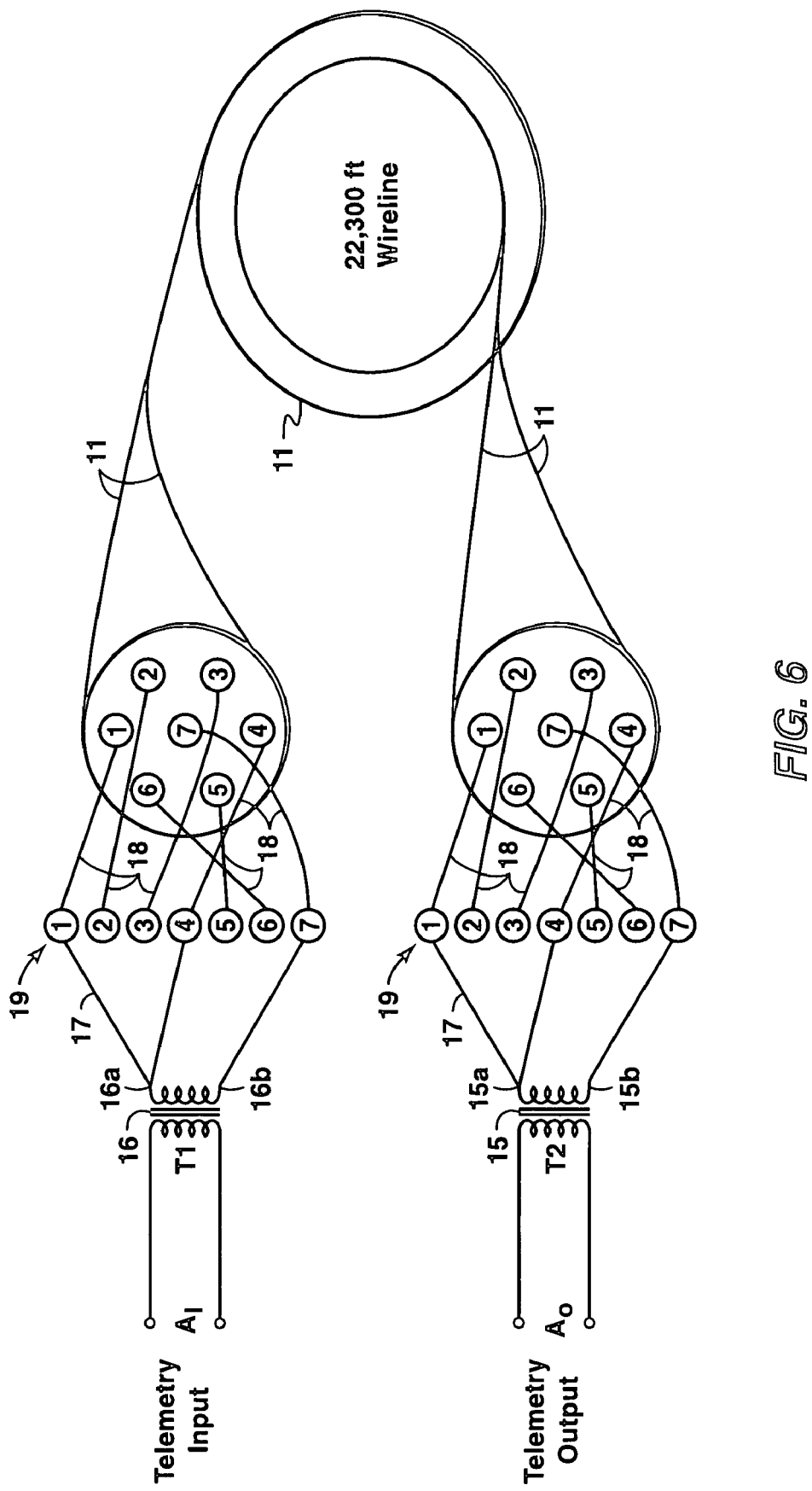
FIG. 6 is a schematic illustration of a test configuration used to illustrate the embodiment of pairing of opposing wires on one terminal.

An alternative embodiment is illustrated in FIG. 6. This method uses only three conductors 18 to transmit signals. One terminal of each transformer (terminals 15a and 16a) is tied to conductors 1 & 4, and the remaining terminals (15b and 16b) are attached to the center conductor 7. This system would be appropriate if a design tradeoff were required so that four conductors would be available for other uses.

Figure 7:
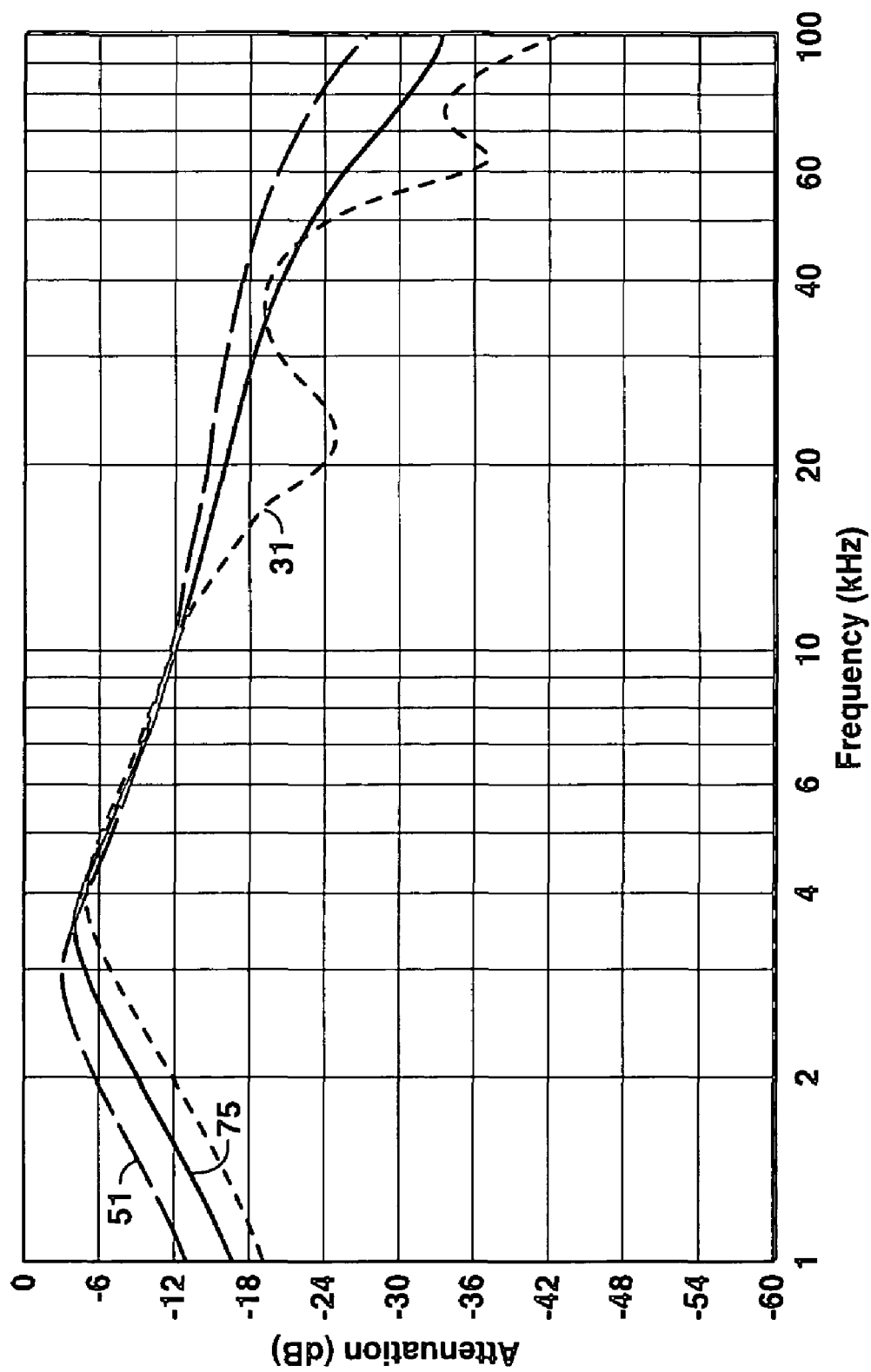
FIG. 7 illustrates the test evaluation results for the self-impedance characterization of the systems illustrated in FIGS. 2, 4, and 6.

The frequency responses of each of these systems are provided in FIG. 7 for comparison. It may be seen that the response of a preferred embodiment (transmitting on 1 & 4 and 2 & 5, FIGS. 4 and 5) 51 has the least attenuation, and the prior art method (transmitting on 2 and 3, FIGS. 1, 2, and 3) 31 has the greatest attenuation. The three-wire system (transmitting on 1 & 4 and 7) 75 has an intermediate characteristic. The advantage of the latter method over the prior art is a modest reduction in attenuation with a pronounced reduction in the variability of the response over the desired frequency band of 10 to 100 kHz. A compensation filter is far easier to design for the system of FIG. 6 than for that of FIG. 2.

Figure 8:
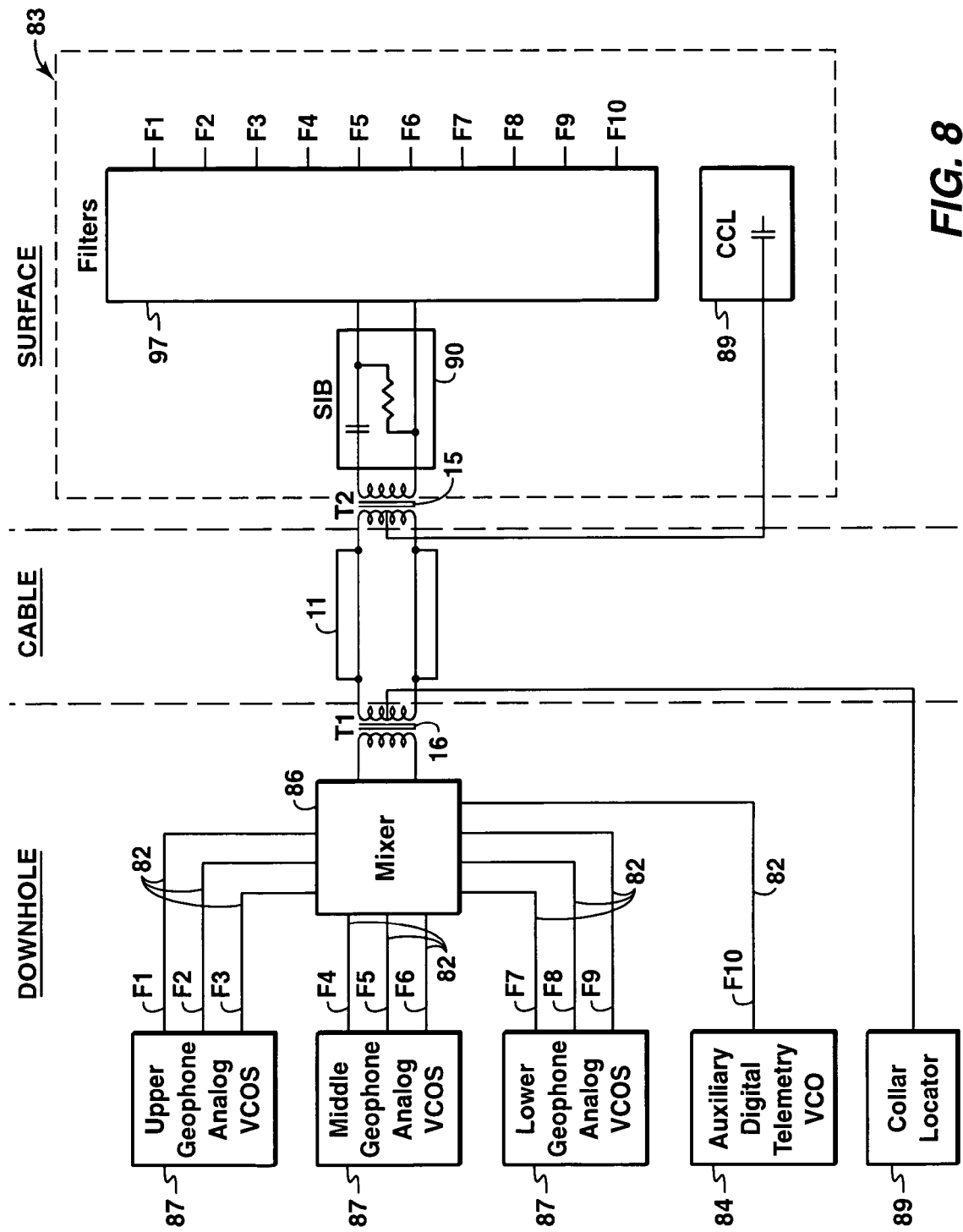
FIG. 8 is a schematic illustration of a telemetry system for the TABS tool that uses the inventive method as shown in FIG. 4.

The system of FIG. 1 may be revised in light of the frequency response improvement, resulting in the system of FIG. 8 which is provided to illustrate one illustrative means of implementing the inventive method. In FIG. 8, the downhole systems are located on the left of the graph, the wireline cable 11 is in the middle, and the surface receiver systems are on the right side. A total of ten FM channels 82 are identified, including nine seismic channels (F1-F9) that support three triads of orthogonal geophones. The analog geophone output signals are passed through voltage-controlled oscillators (VCOs) 87 to generate sinusoidal signals with small frequency variations about center carrier frequencies operating in the range of 10 to 100 kHz. Thus, the input voltage signals are transformed into signals with frequency variations, about distinct carrier frequencies.

In the embodiment of FIG. 8, the data transmittal means are the transformer 16 located both downhole and on the surface of the earth. However, persons skilled in the art would understand that other known devices (e.g., high-current output amplifier with isolation at the transmittal means and high impedance input device at the receiver means) could be used as the data transmittal means and receiver means.

One embodiment uses an auxiliary digital telemetry voltage-controlled oscillator (VCO) 84. This "digital FM channel" can be implemented by digital modulation of each full or half wave of a sinusoid. For example, a wavelength may be modulated at a low frequency (i.e., 3.6 kHz) to transmit a "0" and a high frequency (i.e., 4.2 kHz) for a "1". This may be determined by measuring the period between zero crossings in the detector and assigning a "0" to a long period and a "1" for a short period. This method provides for downhole-digitized data to be sent directly uphole. In the system of FIG. 8, there is one such digital FM channel F10 that transmits multiplexed digital data from several devices (i.e., wellbore pressure, wellbore temperature, tool temperature, tool voltage, tool inclination and tool azimuth). The update period to service all of the devices depends on the signals to be transmitted as well as the implementation of the analog/digital converter, but would typically be in the range of one to several seconds.

In the Mixer 86, these FM signals (up to ten or more) are then summed together to create a single input signal that contains all of the real-time data from this tool. This signal is applied to the inputs of a single step-down output transformer 16 and is subsequently transmitted uphole over two pairs of wires using the inventive method. The system shown in FIG. 8 also includes the transmission of an auxiliary casing collar locator (CCL) 89 signal on the transformer secondary centertap lines.

At the surface 83, the signal is applied to the inputs of a complementary step-up transformer 15. The transformer outputs are then passed into a "Surface Input Board" (SIB) 90 which has a compensating high-pass filter to balance the signal across the frequency band. The SIB also has an automated gain section to boost the signal to a specified level. This filter section consists of cascaded sections of a simple RC (resistance and capacitance) filter design, with parameters selected to flatten the signal over the desired bandwidth and to reject low frequency noise that may be present.

Figure 9:
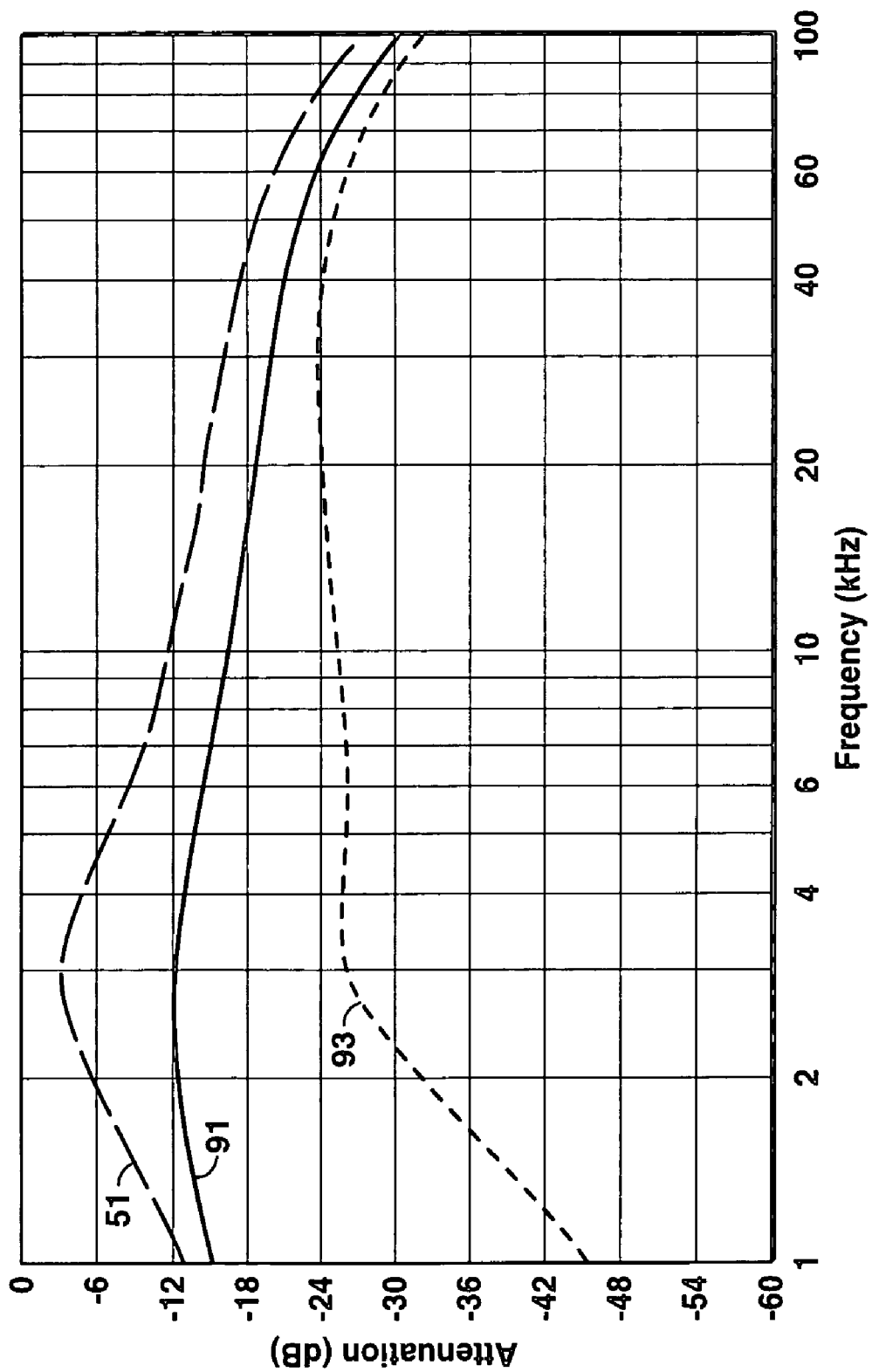
FIG. 9 is a graph showing the frequency response for different termination characteristics (resistor R and capacitor C values) at the terminals of the surface transformer as illustrated in FIG. 8.

FIG. 9 illustrates the signal of the inventive method with no compensation (FIG. 5) 51. The system response with an R value of 5 kΩ and no capacitance C (91) and the preferred approach of using a 5 kΩ (kilo-ohms) resistor R and an 820 pF (picofarads) capacitor C (93) are also shown. The compensation filters measurably flatten the system response with some reduction in overall signal amplitude. The purpose of the compensation filtering is to achieve a smaller deviation in amplitude response as a function of frequency over the desired signal bandwidth of approximately 1 kHz to 100 kHz. The gain portion of the SIB 90 then increases the signal strength to a specified level.

In one embodiment, the output signal from the compensation filter may be passed into a surface unit system that performs signal band separation, demodulation, and signal reconstruction in the analog domain. As shown in FIG. 8, a comb filter (frequency selection filter) or bank of bandpass filters 97 may be used to select each of the carrier frequencies. The bandpass filters 97 are followed by individual signal FM demodulation known to those skilled in the art. The recovered signals may have frequency content up to 3 kHz or more and may be sampled at rates up to 10 kHz or higher.

In an alternate embodiment, the surface equipment may be configured to use commercially-available digital signal processing products. In this embodiment, the filters 97 and signal demodulation of FIG. 8 may be replaced with the DSP prep circuit or logic 148 and DSP processing device 150 of FIG. 10, which is discussed below. In this configuration, the DSP prep circuit 148 receives the output of the SIB module 90, provides bandpass filtering on the composite modulated signal, and conditions the output amplitude for the specific input requirements of DSP processing device 150. The specific requirements of this DSP processing device 150 may alter the design parameters of the downhole system to optimize the system interfaces, facilitating transmission of carrier frequencies up to about 100 kHz. This alternate embodiment may reduce cost and component footprint, while also enhancing the system performance.

It may be appreciated that the analog to digital conversion process may occur at different locations within the processing flow, and the basic concept of selecting frequency bands and demodulating the frequency-modulated signal to recover the original amplitude-modulated signal may occur in a number of different possible implementations.

To further enhance the embodiment of the present techniques, the waveforms of the channel signals may be adjusted to reduce the influence of noise on the channel signals. For example, as noted above, sine waveforms may be utilized as the channel signals for the system because sine waveforms are pure waveforms that do not experience interference from harmonics. However, modulating sine waveform signals without noise and/or distortion may be difficult. As such, the channel signals may include different types of waveforms, such as triangular waveforms, square waveforms, sawtooth waveforms, or other similar types of waveforms. In particular, the systems of FIGS. 8 and 10 may utilize odd-function waveforms, such as triangular waveforms, as the base waveform for the channel signals. A triangular waveform signal is generated by an up and down integration of a constant value and may be provided with reduced noise relative to the sine waveform. Small variations of the input integration signal yield a frequency modulated triangular waveform.

Figure 10:
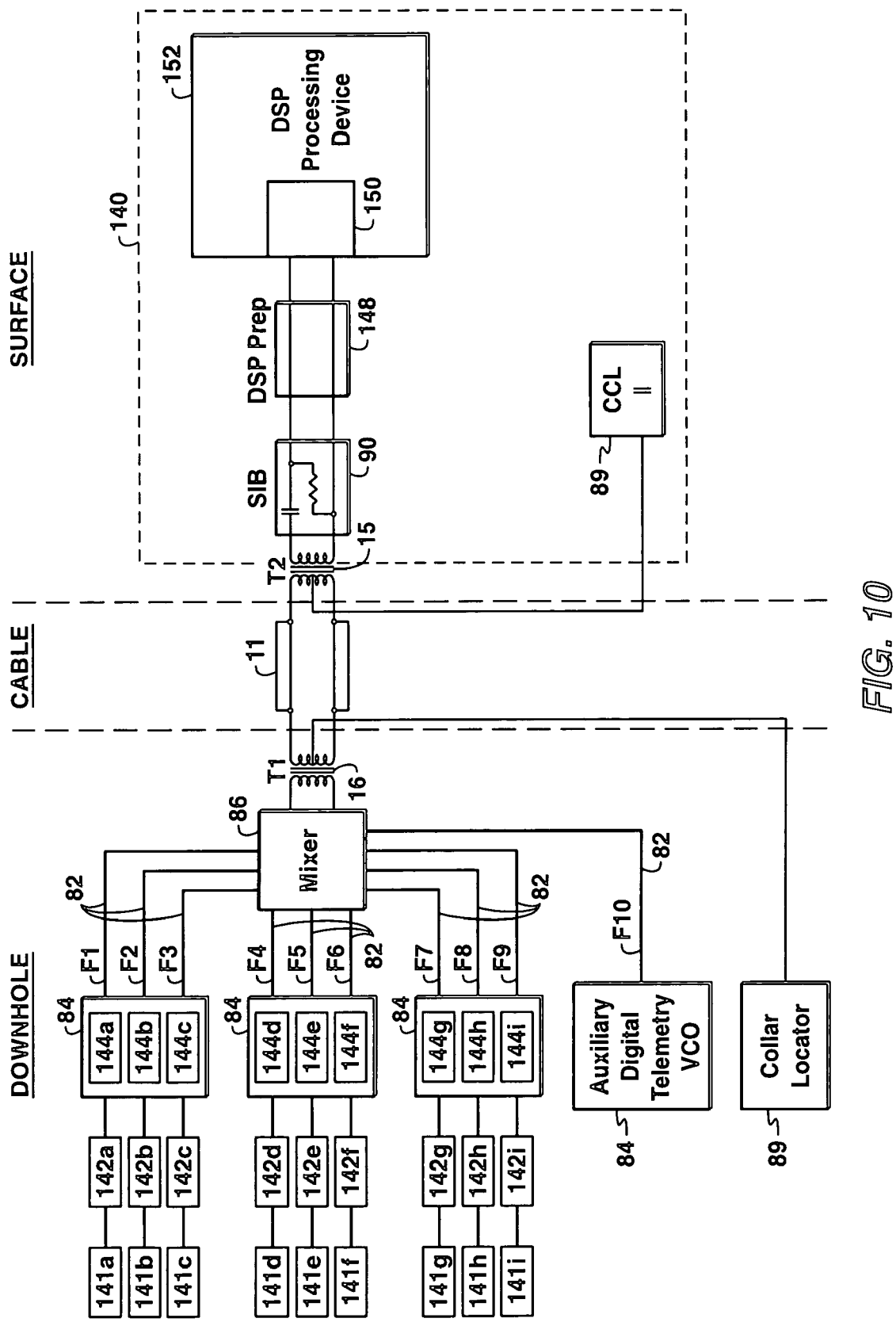
FIG. 10 is an exemplary embodiment of an alternative telemetry system configuration in accordance with aspects of the present techniques.

For the systems of FIGS. 8 and 10 to utilize triangular waveform signals, various aspects of the frequency bands of these waveform signals may be adjusted to reduce possible interference. To begin, it should be noted that triangular waveform signals experience interference from odd-harmonics, but do not experience interference from even-harmonics. Therefore, the first odd harmonic of a lowest frequency channel signal of a given bandwidth occurs at a frequency that is three times that of the lower edge of the frequency band of the channel signal. Accordingly, the upper edge of the highest frequency band of a channel signal should be less than three times the frequency of the lower edge of the lowest frequency of the first channel signal. This harmonic interference may be better understood with reference to FIG. 11.

Figure 11:
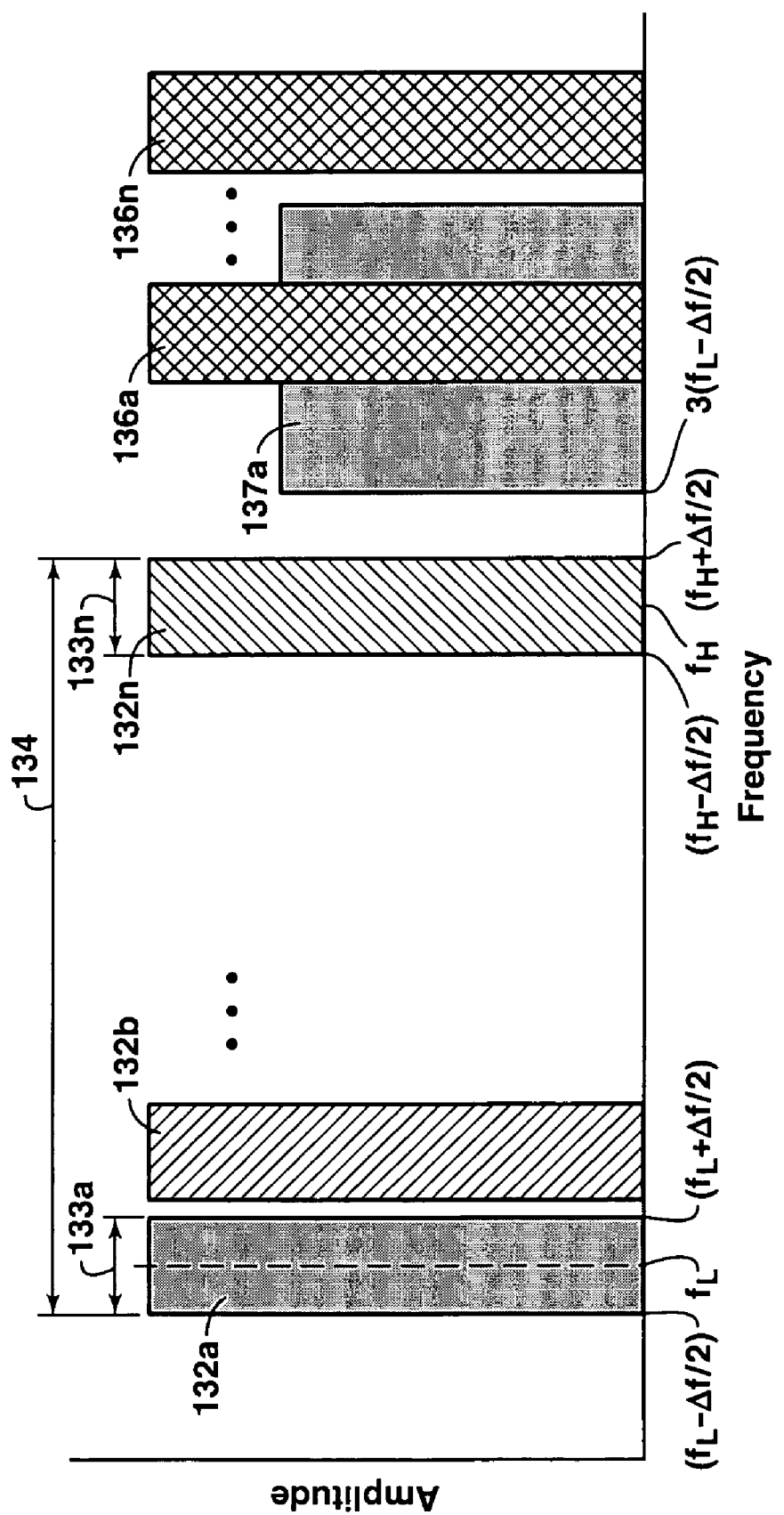
FIG. 11 is an exemplary diagram of frequency bands utilized in the process of FIG. 10 in accordance with aspects of the present techniques.

FIG. 11 is an exemplary diagram of frequency bands utilized in the configurations of FIGS. 8 and 10 in accordance with aspects of the present techniques. With analog signals, one or more channel signals 132a-132n may define a frequency range 134 and may be characterized by amplitude versus frequency over a portion of the modulated signal. Each of these channel signals 132a-132n include individual frequency bands 133a-133n that are centered on a specific frequency within the frequency range 134. If these channel signals 132a-132n are triangular waveform signals, then the system may be configured such that the first harmonic of the lowest channel signal 132a is greater than the highest frequency of the channel signal 132n in the frequency range 134. By managing the frequency range 134 in this manner, the interference between channel signals 132a-132n may be reduced or even eliminated. In addition, one or more auxiliary digital channel signals 136a-136n are inherently more noise tolerant. As such, these auxiliary digital channel signals 136a-136n may be utilized in the presence of harmonic contributions of lower frequency channel signals 132a-132n, above the frequency range 134.

In the case of triangular waveforms, the first channel signal 132a may be located at a low frequency $f_L$ and the last channel signal 132n may be located at the high frequency $f_H$. If each of the channel signals 132a and 132n have a constant frequency bandwidth 133, such as frequency bandwidth $\Delta f$, the lower edge of the first channel signal 132a may be represented by $f_L-\Delta f/2$, while the upper edge of the last channel signal 132n may be represented by $f_H+\Delta f/2$. Because the first odd harmonic of the lower edge of the first channel signal 132a is the first harmonic that may interfere with the last channel signal 132n, the upper edge of the last channel signal 132n should be less than the first odd harmonic of the lower edge of the first channel signal 132a. That is, the upper edge of the last channel 132n, $(f_H+\Delta f/2)$, should be less than $3(f_L-\Delta f/2)$. As such, the frequency range of the analog channels 134 may include the frequencies from $f_L-\Delta f/2$ to a frequency that is less than $3(f_L-\Delta f/2)$.

Additional channels are centered at various frequencies spaced within this frequency range 134 between the lowest and highest frequencies of the channel signals 132a and 132n, in a manner to prevent overlap of channel frequency bands 133a-133n. Also, stop bands, which are the spaces between the frequency bands 133a-133n, may overlap. However, the channel pass bands or frequency bands 133a-133n do not overlap to prevent distortion. Further, auxiliary channel signals 136a-136n may be utilized within or outside the frequency range 134. While these auxiliary channel signals 136a-136n may overlap with the harmonic signals 137 of the channel signals 132a-132n, the system may utilize the auxiliary channel signals 136a-136n as digital signals to compensate for the interference and distortion.

Accordingly, with the present technique, different frequencies are assigned to different channel signals to reduce interference. For example, a system such as that shown in FIG. 10 may utilize ten different frequencies to transmit data channel signals. The first nine channel signals may include analog seismic data and may be located on the lower frequencies of the frequency range 134, adhering to the procedure established in FIG. 11. The tenth channel signal may be an auxiliary digital channel that is resistant to noise degradation and thus operated above the frequency range 134.

FIG. 10 is an exemplary embodiment of an alternative telemetry system configuration in accordance with aspects of the present techniques. This system 140 may be similar to and include various components of the system 83 of FIG. 8 to manage the communication and processing of the channel signals. Similar to the discussion above, ten FM channels 82, which may include the channel signals 132a-132i and 136a of FIG. 11, are utilized to communicate data over a wireline to surface equipment. These channels 82 may include nine seismic channels (F1-F9) and one digital FM channel F10. In this embodiment, square rooters 142, VCOs (Voltage-Controlled Oscillators) 144, and a mixer 86 are utilized to generate a composite modulated signal from channel signals. This single composite modulated signal is transmitted over a transformer pair 15 and 16 via the wireline 11 to the surface, where SIB 90, DSP prep circuit 148, and DSP processing device 150 are utilized to process the composite modulated signal to extract the channel signals.

As noted above, the downhole tool is utilized to provide seismic data to the surface units 83 and 140 via the wireline 11. The downhole tool includes three triads of orthogonal geophone signals 141a-141i. The geophone signals 141a-141i are typically analog seismic data signals. These seismic data signals are provided to the square rooters 142, which may be individual square rooters 142a-142i that are each associated with a specific one of the channel signals. The square rooters 142 convert the seismic data signals from a first voltage range to a second voltage range that is lower than the first voltage range. In particular, each of the square rooters 142, which are further described in FIG. 14, generate a rooter output signal or signed-square root output signal that is the signed square root of the seismic data signal received by that square rooter 142a-142i, achieving data range compression. The rooter output signal is provided to the VCOs 144, which may operate similar to VCOs 87 and VCO 84 of FIG. 8. Each of the VCOs 144 generate a triangular waveform signal and modulate this signal about its center frequency with the output from the respective square rooter 142. As an example, the VCOs 144 may generate signals having triangular waveforms with frequency variations about center carrier frequencies operating in a range of about 10 to 100 kHz, or more specifically, in a range of about 30 kHz to 90 kHz. These triangular waveform signals are provided to the mixer 86, which combines the triangular waveform signals from the channels 82 with multiplicative weights to balance the resulting composite modulated signal. Also, the mixer 86 may balance the amplitude of certain channel signals to provide a slight boost in the higher frequency components to offset frequency-dependent attenuation along the wireline. The transformer 16 transmits the composite modulated signal on the wireline 11, as discussed above.

At the surface 140, the composite modulated signal is provided to the inputs of a complementary transformer 15. The transformer 15 provides output signals to the SIB 90 which may have a high-pass filter, an automated gain, and compensate for line and impedance loss. These circuits may be tuned for different ranges of wireline lengths to keep the parameters within an optimal band, using for example a five-position switch for "zero", short, medium, long, and extra-long wireline lengths. From the SIB 90, the signal is provided to the DSP prep circuit 148 which may include low-pass and high-pass filters to condition the signals to the range of about 10 to 100 kHz or about 30 to 90 kHz. An output amplifier buffer may also scale this filtered signal to a desired voltage output range as may be required by DSP processing device 150.

The DSP processing device 150 may be a commercially-available digital system that may be adapted for use by software customization. In particular, the DSP processing device 150 may be an ICS-652 digital data acquisition board located in computer system 152, such as the TABS surface unit. The ICS-652 digital data acquisition board may operate at 64 MHz with a DC-50-MN multi-channel tuner module. The DSP processing device 150 may demodulate the signal into the various channel signals that correspond to the channels 82. The operating software may be based on Matlab with the ICS Matlab library used as a starting point for this custom software application. The DSP processing device 150 may separate each channel and demodulate these signals to reconstruct the amplitude-modulated signals that were input to each of the VCOs in the system. Demodulation processes that convert instantaneous frequency to instantaneous amplitude changes are commonly known and are supported by commercially-available equipment such as the ICS-652 multi-channel tuner board. These methods may rely upon comparing the phase angles (similar to the Matlab "demod" function) or perhaps other methods, such as Kalman filters, or other variety of tracking algorithms.

The use of digital components in DSP processing device 150 provides greater flexibility to correct errors in the signals and modify the signals than fully analog systems. For instance, the center frequency of a channel signal may drift as the temperature fluctuates within the wellbore, despite the presence of first-order compensation circuitry or logic applied to the VCOs. This temperature drift creates a DC offset in the demodulated signal. In a digital system, the DC component may be removed and additional filtering may be performed to improve the signal quality. Also, digital systems may adjust the frequency bands for larger drift errors and facilitate interchange of components that operate at slightly different frequencies. For example, the data acquisition software may include a process to "tune" a center frequency to the current center frequency value by adjusting the center frequency until the calculated DC component vanishes. It is more difficult to adjust a completely analog system, and matching of downhole tool and surface unit is operationally cumbersome. Finally, the digital signals may be more efficiently modified and managed for transmission to other devices, such as a second computer that is used to analyze data in real-time. This may be accomplished using an ethernet connection and a data buffer. An example chart of the frequencies utilized in the modulated signal for this system is shown in FIGS. 12A and 12B.

FIGS. 12A and 12B are exemplary charts of modulated signals obtained from the system 140 of FIG. 10 in accordance with aspects of the present techniques. Accordingly, the charts 158 and 160 of FIGS. 12A and 12B may be best understood by concurrently viewing FIGS. 10 and 11. This chart, which may be referred to by reference numeral 158, shows the raw form of the amplitude versus time for the composite modulated signal 162. In FIG. 12A, an exemplary composite modulated signal 162 is transmitted from a downhole tool, such as the mixer 86, to surface equipment, such as SIB 90.

In FIG. 12B, the chart 160 of amplitude versus frequency shows the composite modulated signal 162 divided into various channel signals 164a-164j, which are positioned around different center frequencies corresponding to the channel signals 132a-132n and 136a. Continuing with the example discussed above, the channels 82 may include nine analog seismic channels 164a-164i and one auxiliary digital channel 164j. Accordingly, for this system 140, the seismic data channels 164a-164i may be centered on frequencies in the range of about 30 kHz to about 72 kHz, while the one auxiliary channel 164j may be centered around a frequency of about 80 kHz. As a result of using these frequencies, the first harmonic of the lowest frequency, which is about 81 kHz, does not interfere with the highest frequency analog signal at about 77 kHz.

Figure 13:
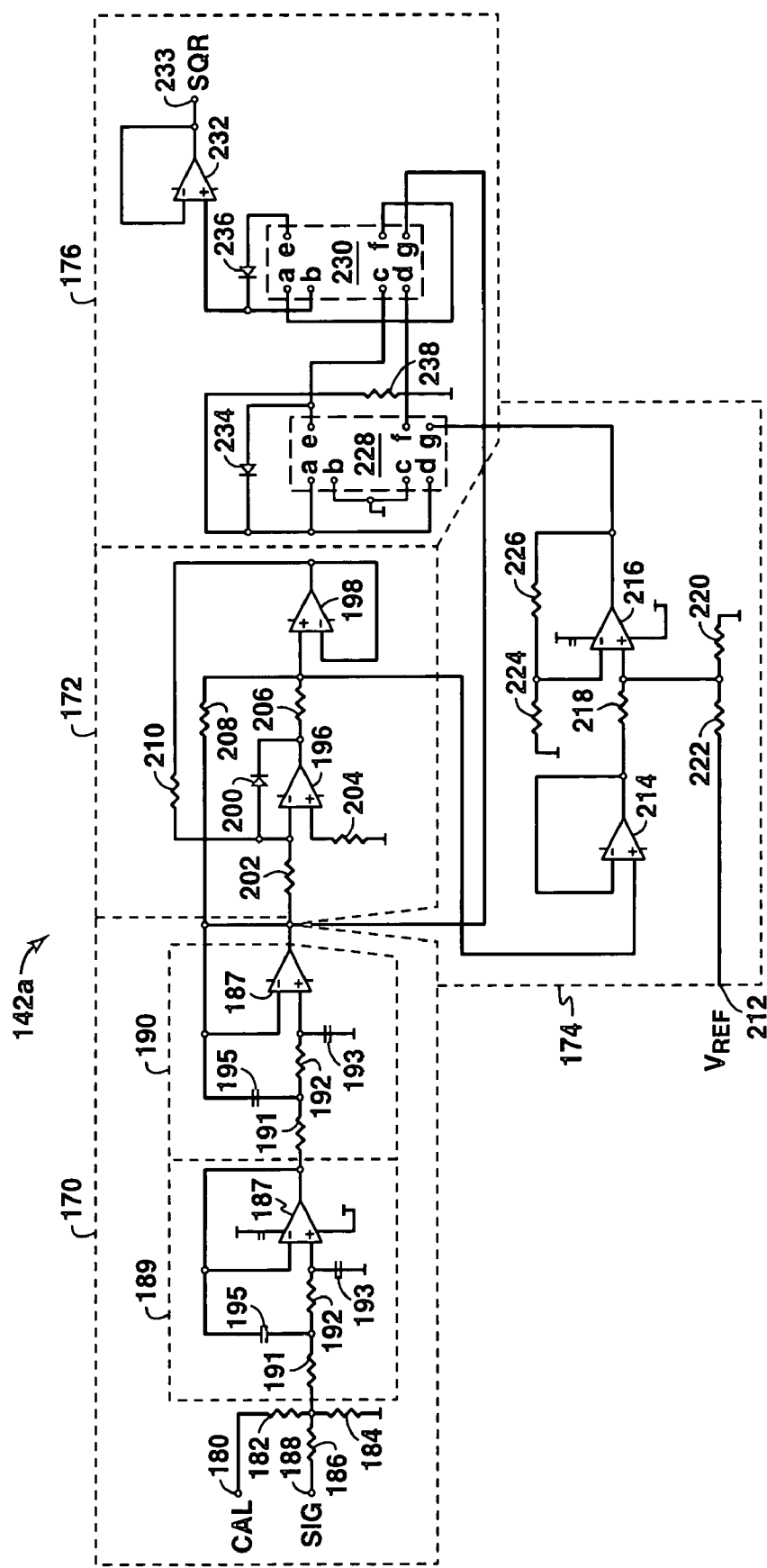
FIG. 13 is an exemplary schematic diagram of the square rooter of FIG. 10 in accordance with aspects of the present techniques.

As noted above, various hybridized components may be utilized to handle the processing of the data signals. In particular, the square rooters 142 may be utilized to provide compressed output signals that are the signed square root of the input signals from the geophones. FIG. 13 is an exemplary schematic diagram of the one of the square rooters 142 of FIG. 10, such as square rooter 142a, in accordance with aspects of the present techniques. In the schematic diagram, the square rooter 142a may include filtering logic 170, absolute value logic 172, offset adjustment logic 174, and division logic 176 that is utilized to provide a signed-square root output signal or rooter output signal SQR. The signed-square root output signal SQR is the signed square root of the input geophone signal SIG. This filtering logic 170, absolute value logic 172, offset adjustment logic 174, and division logic 176, which may also be referred to as data range compression logic, reduce an amplitude range of ±25 V to ±5 V, while simultaneously boosting the values of signals of amplitude less than 1 V. A high voltage input signal is thereby reduced to a smooth lower voltage output signal without loss of resolution of the smaller signals.

The square rooter 142a may include various resistors 182, 184, 186, 191, 192, 202, 204, 208, 210, 218, 220, 222, 224, 226 and 238; terminals 180, 188, 212 and 233; capacitors 193, 195; diodes 200, 234 and 236; op-amps 187, 196, 198, 214, 216, and 232; and division logic or multipliers 228 and 230, which are shown in FIG. 13. In an exemplary configuration, the division logic 176 is comprised of two multipliers 228 and 230. The multiplier 228 is configured as a square rooter, with a gain equal to k*(sqrt(abs(Vin))). Mathematically it provides unity gain at input values of 1, higher gains for values less than 1, and attenuates values greater than 1. The scaled square root absolute value output is applied to multiplier 230 configured as a divider. Multiplier 230 divides the original output from filter op amp 187 by this signal. The output from the multiplier 230 is the scaled mathematical equivalent of the input divided by the square root of the absolute value of the input (which restores the original sign of the signal), with an offset bias to eliminate division by zero. The output of the divider section is buffered through the buffer op amp 232 as the output signal at the output terminal 233, which is the signed-square root output signal SQR.

As specific examples of the components utilized, the square rooter 142a may be configured to receive 25 volt peak geophone signals and provide a 5 volt peak output signal. In this configuration, resistors 182,184, 186, 202, 208, 210, 218, 220, 224, 226 and 238 may be 10 kΩ resistors. Resistors 191 and 192 may be 24 kΩ resistors, resistor 222 may be a 487 kΩ resistor, and resistor 204 may be a 4.99 kΩ resistor. Capacitor 195 may be 5400 pF, while the capacitors 193 may be 2700 pF. Diodes 200, 234, and 236 may be 1N914B diodes from Fairchild Semiconductor. The op-amps 187, 196, 198, 214, 216, and 232 may be OP-470 op amp from Analog Devices, Inc. The division logic 228 and 230 may be AD534 division logic from Analog Devices, Inc. With these components, a geophone output signal SIG may be received and converted into an output signal, which is the signed-square root output signal SQR that is 5 volts peak amplitude. Accordingly the square rooter 142a may provide a signal which may be further processed by another hybridized component, such as VCOs 144, as shown in greater detail in FIG. 14.

Figure 14:
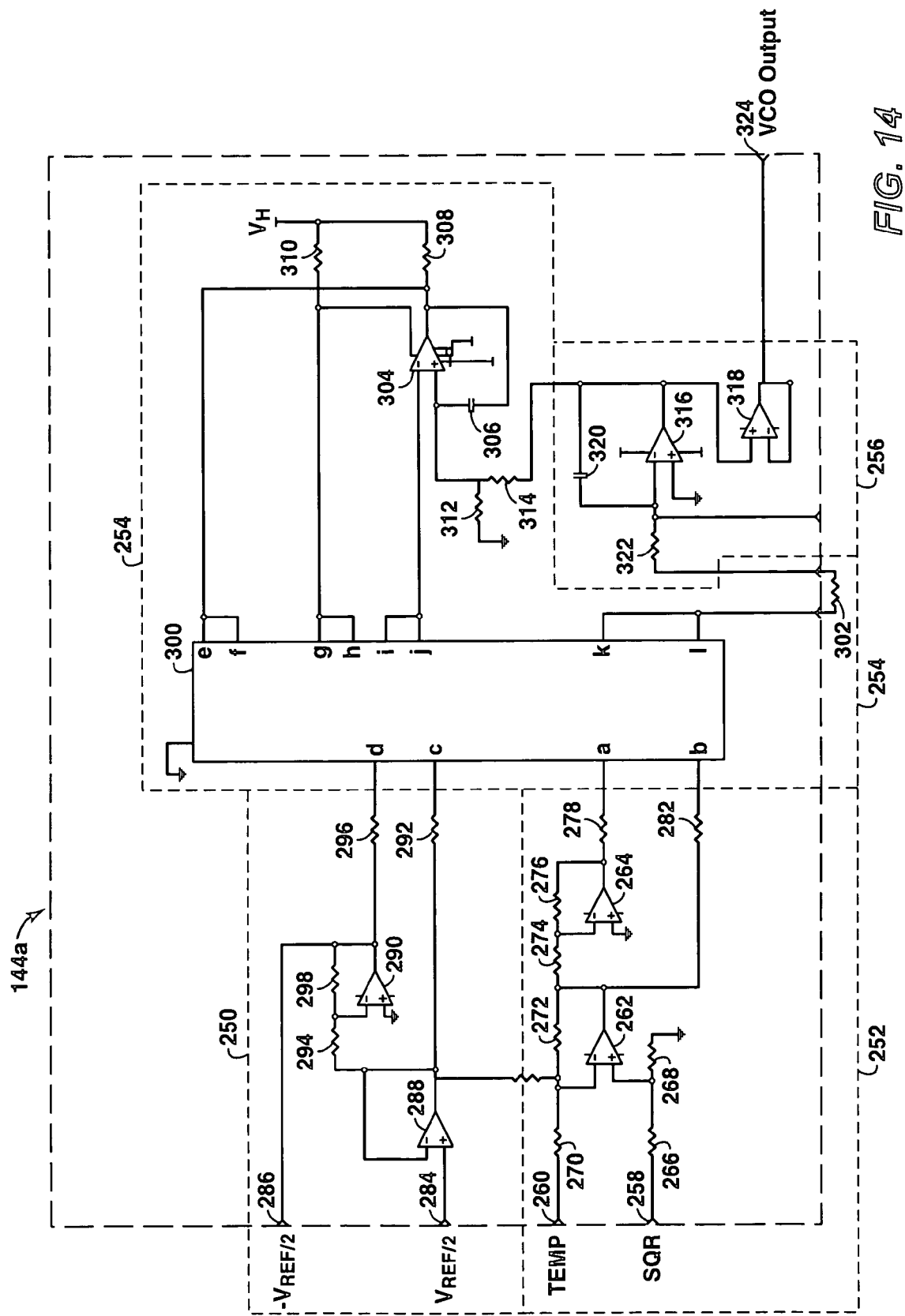
FIG. 14 is an exemplary schematic diagram of the VCOs of FIGS. 8 and 10 in accordance with aspects of the present techniques.

FIG. 14 is an exemplary schematic diagram of one of the VCOs of FIG. 10 in accordance with aspects of the present techniques. In the schematic diagram the VCO, which may be VCO 144a, is configured to generate triangular waveform signals. By utilizing triangular waveforms, the frequency range 134 of FIG. 11 may include frequencies from the lowest frequency to the third harmonic of that lowest frequency without harmonic interference from other signals in the frequency range. In the schematic diagram, the VCO 144a may include voltage logic 250, signal input and temperature drift logic 252, switching logic 254, and integration logic 256 to generate a 5-Volt peak frequency modulated triangular waveform signal. It should be noted that the various signals from various VCOs at different frequencies may be mixed together by the mixer 86 for transmission to the surface system 140, as discussed above.

The VCO 144a may include various resistors 266, 268, 270, 272, 274, 276, 278, 282, 292, 294, 296, 298, 302, 308, 310, 312, 314 and 322; terminals 258, 260, 284, 286 and 324; capacitors 306 and 320; op amps 262, 264, 288, 290, 316 and 318; comparator 304; and electronic switch 300, which are shown in FIG. 14. As an example configuration, the VCO 144a operates as a linear integrator with a switched reverse point. With inputs into logic 250 and 252, voltages are applied to the electronic switch 300. The integration logic 256, which may be referred to as an integrator, integrates negative with a positive input to it from the switch 300. The switch applies a negative reference voltage to the comparator and remains in this state until the negative integrator output exceeds it. Then, the comparator 304 switches the reference voltage and the input to the integration logic 256 via switch 300 to the opposite polarity. The reference voltage goes positive and the input of the integration logic 256 goes negative. Then, the integration logic 256 generates a linear ramp toward the positive reference voltage and at the reference level the switch 300 operates again. Accordingly, the cycle repeats while the VCO 144a remains operational. A change in the inputs varies the ramp slope and thereby the frequency yielding the modulated signal. The output signal from the integration logic 256 is buffered to the VCO output 324.

To begin, the channel input section may include voltage logic 250 and signal input and temperature drift logic 252, which receive various input signals into the VCO. The input signals may be the signed-square root output signal SQR or may be an input signal from other components. In this example, the ±5 V input signal SQR is presented to the input terminal 258 of the input logic 252 from the square rooter 142a or some other source across a high pass filter circuit (not shown). The high pass filter eliminates DC offsets and low frequency signals from the input signal. Also, a DC voltage, which is the temperature signal TEMP and represents the circuit temperature, is applied from a temperature transducer to the input terminal 260. A reference voltage signal $V_{REF/2}$ is applied to the input 284 to provide a base input signal for the VCO oscillator integration ramp. By providing the temperature signal TEMP to the input terminal 260 and the reference voltage signal $V_{REF/2}$ to the input 284 and subtracting the result from the input signal SQR, a temperature compensated output signal is provided from the op amp 262 to the switch 300. This temperature compensated output signal is inverted by the inverting op amp 264, and both output signals are applied to the switch 300. The switch 300 may be a dual electronic switch that is configured as double-pole, double-throw (DPDT). Because the output signals are constantly present, the output signal through resistor 278 equals the inverse of the output signal through resistor 282. These resistors 278 and 282 may limit the current transients generated by the switching of the switch 300. The output signals are locked out of phase with the reference voltage signal $V_{REF/2}$ by the operation of the switch 300.

Also, the reference voltage signal $V_{REF/2}$ is provided to the buffer 288 and is inverted by the inverting op amp 290. These output signals are provided via resistors 292 and 296 to the switch 300. Resistors 292 and 296 may limit the transient current generated by the operation of switch 300. The positive reference is also applied through a summing resistor to the adder op amp 262.

The switch logic 254 provides the switched input signal to the integration logic 256 and the amplitude comparator 304. The amplitude comparator 304 drives the switch 300 in a DPDT configuration. As a result, the switch 300 provides the negative reference signal and the positive reference signal or vice versa to the comparator 304 and to an input of an integrator op amp 316 via a frequency resistor 302, which sets the center frequency for the VCO 144a.

The integrator logic 256, which includes resistor 322, capacitor 320, op amps 316 and 318, and output terminal 324, provides a linear ramp. The slope of the ramp in volts per microsecond varies linearly with the input voltage from the switch 300 across the frequency resistor 302. The frequency of the output from the VCO 144a is determined by the length of time the integrator logic 256 utilizes to traverse from the positive reference level to the negative reference level and back again, as seen by the comparator 304, completing one cycle. The reference voltage is applied from the switch 300 to the comparator 304 and is a fixed amplitude square wave at any given input signal level. The output of the integrator logic 256 is also applied to the comparator 304 for amplitude control and through the buffer op amp 318 to the output terminal 324 for use in the mixer 86.

As a specific example of one exemplary configuration, the VCO 144a in FIG. 14 may be configured to operate at a frequency of 30 kHz. This center frequency is determined by selecting the frequency resistor 302 to set the triangular frequency to 30 kHz with zero input on terminal 258. Values for resistor 302 are shown in Table 1 for representative center frequencies:

| Center Frequency | Frequency Resistor Value |
|---|---|
| 80 kHz | 4.67 kΩ |
| 75 kHz | 5.73 kΩ |
| 68 kHz | 6.58 kΩ |
| 62 kHz | 8.01 kΩ |
| 56 kHz | 8.98 kΩ |
| 50 kHz | 11.38 kΩ |
| 45 kHz | 13.06 kΩ |
| 40 kHz | 15.86 kΩ |
| 35 kHz | 18.39 kΩ |
| 30 kHz | 22.48 kΩ |

Accordingly, these different values for the frequency resistor 302 may be utilized in various configurations for the different VCOs 144.

In this configuration, the resistors 266 and 270 may be 100 kΩ resistors, resistors 268, 272, 274, 276, 294 and 298 may be 13.7 kΩ resistors, the resistors 278, 282, 292 and 296 may be 1 kΩ resistors, the resistors 308 and 310 may be 20 kΩ resistors, the resistors 312 and 314 may be 4.99 kΩ resistors and the resistor 322 may be a 3.653 kΩ resistor. The capacitors 306 and 320 may be 220 pF capacitors, while the op amps 262, 264, 288, 290, 316 and 318 may be OP-470 op amps from Analog Devices, Inc. The comparator 304 may be a TI3016 comparator from Texas Instruments, Inc. Finally, the switch 300 may be a Siliconix DG-271A switch from Vishay Siliconix. In this configuration, the positive or negative input signals SQR may decrease or increase the frequency of the signal at the output terminal 324 by ±2500 Hz for a ±5 Volt input signal SQR. In this manner, the VCO 144a may provide a triangle waveform signal that operates within a ±5-Volt range to another hybridized component, such as the mixer 86, as discussed in greater detail in FIG. 15.

Figure 15:
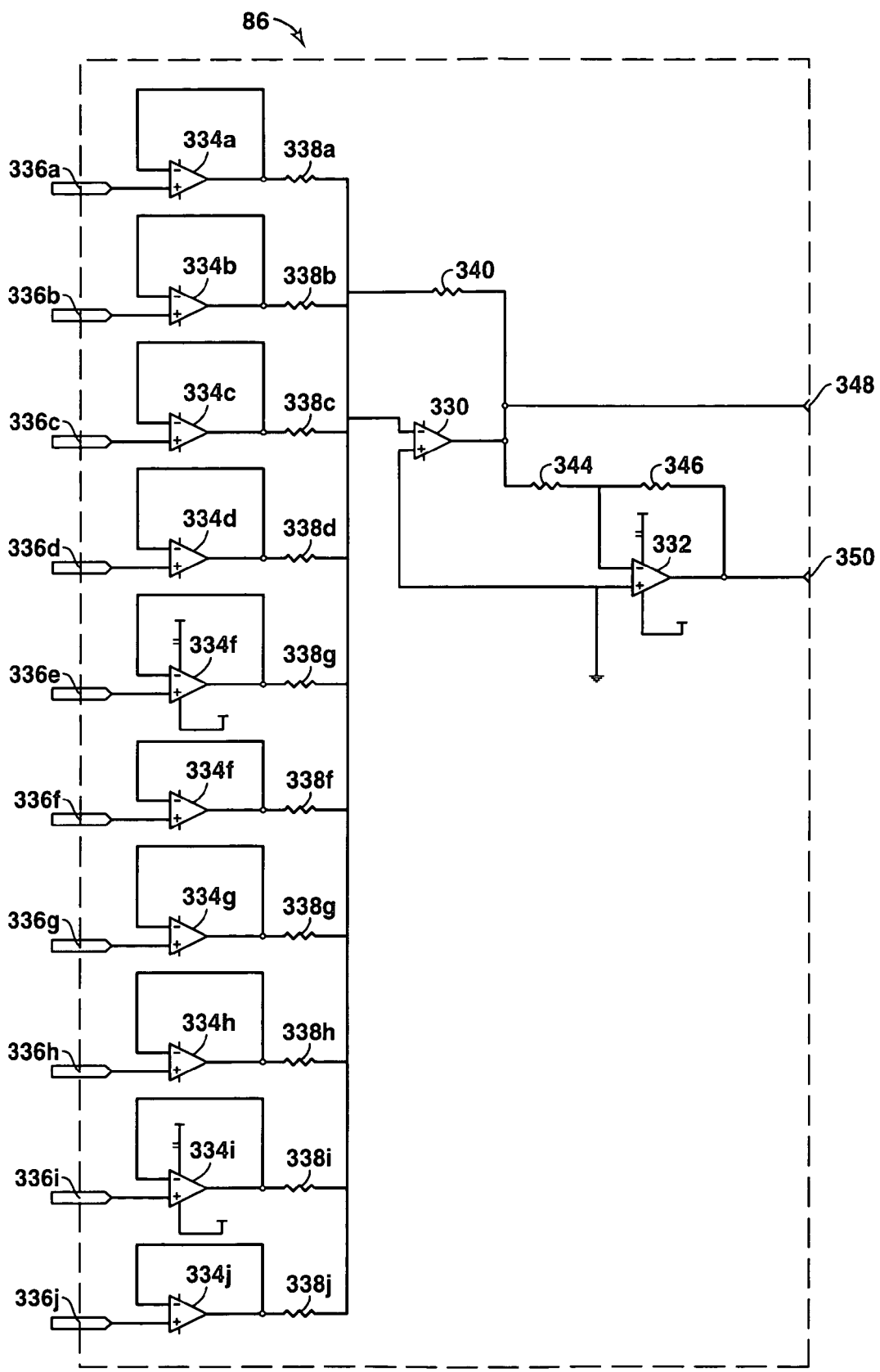
FIG. 15 is an exemplary schematic diagram of the mixer of FIGS. 8 and 10 in accordance with aspects of the present techniques.

FIG. 15 is an exemplary schematic diagram of the mixer 86 of FIGS. 8 and 10 in accordance with aspects of the present techniques. In the exemplary schematic diagram, the mixer 86 is configured to receive 10 input channel signals via the input terminals 336a-336j, which may be frequency-modulated ±5 Volt triangular waveform signals 82. As discussed above, each of the signals are centered at different frequencies, which may be specified by the respective VCOs 144a-144i. Buffer op amps 334a-334j drive summing resistors 338a-338j. These signals are summed and scaled by an op amp 330. The output of the summing op amp 330 is inverted by an inverting op amp 332. The out-of-phase output signals from the two op amps 330 and 332 are used to drive the transformer 16 to provide the composite modulated signal to the surface equipment.

To begin, the triangular waveform signals are provided to the input terminals 336a-336j from the VCOs, such as VCO 144a. Each of these signals is applied to one of the unity gain buffer op amps 334a-334j. In this embodiment, the frequencies are in descending order from 336a-336j. Alternatively, the buffer op amps 334a-334j may be configured as inverting unity gain op amps to facilitate impedance control of the input signal line for noise reduction purposes.

The input signals are provided to the summing op amp 330, the amplitude scaling resistor 340, and the weighted value input summing resistors 338a-338j. The summing resistors 338a-338j may each be of about equal value or sized to compensate for line loss of the frequency component they add to the composite modulated signal. For instance, the resistors for high and low frequencies may be increased or decreased to adjust for attenuation, while the resistors of the mid level frequencies are about equal. In particular, resistors for 338a-338c may increase in value, resistors 338h-338j may decrease in value, and resistors 338d-338g may be about equal. These adjustments in the resistors may emphasize the upper and lower frequencies of the composite modulated signal. As a result, this configuration may be utilized to account for the SIB 90 characteristics, as shown in the system response 93 of FIG. 9.

For example, in one configuration, the values for the summing resistors 338a-338j may be 22.6 kΩ, 24.9 kΩ, 30.1 kΩ, 36.5 kΩ, 40.2 kΩ, 40.2 kΩ, 40.2 kΩ, 40.2 kΩ, 40.2 kΩ and 30.9 kΩ, respectively. The value for the resistor 340 may be 2.49 kΩ, and resistors 344 and 346 may be 20 kΩ. The op amps 330 and 332 may be Analog Devices AD822 op amps.

The output signal from the mixer 86 is push-pull to the primary of the transformer 16. The out-of-phase component is supplied by a unity gain inverting op amp 332 and resistors 344 and 346, which invert the output signal from the summing op amp 330. As a result, the output signal from the mixer 86 is provided push-pull from the outputs 348 and 350 of the op amps.

In addition to the embodiments above, various components may be combined to further enhance the system. For instance, the square rooters 142 and VCOs 144 may be combined into a single logic component. This combination of the square rooters 142 and VCOs 144 may reduce the number of wiring connections and further decrease the footprint of the downhole tool.

Also, certain channel signals may include high precision data that is transmitted at lower data rates. Accordingly, the system 140 of FIG. 10 may utilize downhole digitization for these signals. The data may include wellbore pressure, tool temperature, inclinometer output, and state-of-health diagnostics, for example. Also, the data may be prepared for transmission by use of an asynchronous digital data channel that is fed into a VCO 84 or 144 without a square rooter 142. Tristate asynchronous logic on the digitizer A/D board may be utilized to transmit the data in various states, such as "0" and "1" bits and intermediate-state bits that separate the individual data bits. Because of the robustness of this method, it is transmitted at the highest frequency in the system that might see some incursion from the harmonic of the lowest frequency seismic channel.

Furthermore, the composite modulated signal may be transmitted via two conductors, three conductors, four conductors or more than four conductors in various embodiments. As noted above, the conductors may be arranged in various configurations, such as crosswise-paired or as a pair of conductors that are not directly adjacent to each other. For example, with wireline that includes seven conductors, each conductor, except for the center conductor 7, may be paired with a conductor that is not directly adjacent to it or that is crosswise-paired or opposite to that conductor when the wireline 11 is cut perpendicularly. These conductors may be adjusted to reduce crosstalk and interference between conductors.

By rearranging the wireline conductor assignments and signal mixing, a superior wireline analog signal transfer function may be obtained. This enhanced characteristic enables significant revisions to the telemetry, with support for more than nine seismic channels that are capable of frequency bands of up to 3 kHz bandwidth or more.

Moreover, it should be appreciated that the composite modulated signal may also be utilized for communication between multiple devices within a well with each other or with surface equipment. For example, while the downhole tool is described in the exemplary embodiments, a well may include various monitoring and operational devices, such as gauges, valves, sensors, pumps, downhole tools and other similar devices. These devices may utilize the present techniques to communicate operational or other data to surface equipment in the manner discussed above. These devices may also communicate data to facilitate or enhance the production of hydrocarbons from the wellbore. As such, the present techniques may be utilized to enhance the production of hydrocarbons from a well along with the use for collecting seismic data.

The telemetry method can be useful in other logging tool designs that could accomplish one or more of the following open-hole or cased-hole well logging objectives (the list below illustrates representative applications but is not meant to be limiting). The list includes: caliper logs; cement bond logs; depth logs, including casing collar locator and gamma ray logs; downhole video logs; formation resistivity and radial microimager logs; neutron logs, including flowing neutron and pulsed neutron capture logs; oriented density logs; production logs, including fluid rate, density, and capacitance logs; radial differential temperature logs; radioactive tracer logs; sonic, ultrasonic, and noise logs; temperature and pressure logs; and well surveying logs.

The foregoing description has been directed to particular embodiments of the invention for the purpose of illustrating the invention. It will be apparent to persons skilled in the art, however, that many alternatives, modifications, and variations to the embodiments described herein are possible. All such alternatives, modifications, and variations are intended to be within the scope of the present invention, as defined by the appended claims.

We claim:

1. A method for improved telemetry of a data signal from a first location to a second location using a wireline having at least three conductors, comprising:

(a) connecting one end of said wireline to a data transmittal means at said first location and the other end of said wireline to a data receiver means at said second location, said data transmittal means having first and second output terminals, said data receiver means having first and second input terminals, wherein
  (1) at least two of said conductors are connected to said first output terminal of said data transmittal means and to said first input terminal of said data receiver means, and
  (2) at least one of said conductors is connected to said second output terminal of said data transmittal means and to said second input terminal of said data receiver means;
(b) generating said data signal at said first location;
(c) forming a plurality of frequency modulated channel signals from said data signal that are each associated with a specific frequency band in a frequency range, the frequency range including frequencies from a low frequency band to a high frequency band and the high frequency band is below a harmonic of said low frequency band that interferes with said high frequency band;
(d) summing the plurality of frequency modulated channel signals into a composite modulated data signal;
(e) transmitting said composite modulated data signal from said data transmittal means through said wireline to said data receiver means; and
(f) receiving said composite modulated data signal at said second location.

2. The method of claim 1 wherein said two conductors connected to said first output terminal of said data transmittal means and to said first input terminal of said data receiver means are crosswise paired with opposite conductors in a cable.

3. The method of claim 1 wherein said wireline is deployed in a wellbore, said first location is a downhole location in said wellbore, and said second location is nearer to the surface than the first location.

4. The method of claim 1 wherein said plurality of frequency modulated channels signals comprises analog signals within the frequency range and at least one digital signal modulating a frequency channel outside the frequency range of the frequency modulated channel signals corresponding to the analog signals.

5. The method of claim 1 wherein forming the plurality of frequency modulated channel signals comprises generating an odd-function waveform signal for each of the plurality of channel signals and frequency-modulating each odd-function waveform.

6. The method of claim 1 comprising utilizing the data signal of step (f) to produce hydrocarbons from the wellbore.

7. The method of claim 1 wherein said frequency range is from 1 kHz to 100 kHz.

8. The method of claim 7 wherein the frequency range includes frequencies from about 30 kHz to about 90 kHz.

9. A method comprising:
receiving data from a device in a wellbore;
forming a plurality of frequency modulated channel signals that are each associated with a specific frequency band in a frequency range, the frequency range including frequencies from a low frequency band to a high frequency band and the high frequency band is below a harmonic of said low frequency band that interferes with said high frequency band;
summing the plurality of frequency modulated channel signals into a composite modulated signal; and
transmitting the composite modulated signal to surface equipment, wherein the transmitting comprises communicating the composite modulated signal via a wireline having a plurality of conductors;
utilizing at least two conductors of the wireline between a first downhole terminal of a downhole transformer and a first surface terminal of a surface transformer; and
utilizing at least one other conductor of the wireline between a second downhole terminal of the downhole transformer and a second surface terminal of the surface transformer.

10. The method of claim 9 wherein forming a plurality of frequency modulated channel signals comprises adjusting at least one of the plurality of frequency modulated channel signals to compensate for temperature.

11. A system comprising:
at least one device within a wellbore, wherein at least one device comprises a voltage-controlled oscillator that converts an input signal to one of the plurality of frequency modulated channel signals, wherein the voltage-controlled oscillator comprises:
  channel input section configured to sum an input signal with at least a temperature drift signal from the temperature drift logic;
  switching logic coupled to the channel input section, the switching logic configured to provide the input signal or a complimentary input signal that is the inverse of the input signal and positive or negative reference signals;
  comparison logic to compare the modulated channel signal with a reference signal and output a change of state to the switching logic when the reference value has been exceeded; and
  integration logic coupled to the switching logic and configured to form a modulated channel signal, configured to:
  receive a plurality of data signals;
  create a plurality of frequency modulated channel signals within a frequency range for the plurality of data signals, wherein each of the plurality of frequency modulated channel signals is associated with a specific frequency band in the frequency range and the frequency range including frequencies from a low frequency to a high frequency, the high frequency is below a harmonic of the low frequency that interferes with the high frequency; and
  sum the plurality of frequency modulated channel signals into a composite modulated signal.

12. The system of claim 11 wherein the input signal comprises the signed square root output signal of one of the plurality of data signals.

13. The system of claim 11 wherein the temperature drift logic is configured to compensate for impedance and gain changes as a function of temperature to offset frequency shifts of the voltage-controlled oscillator.

14. A system comprising:
at least one device within a wellbore configured to:
receive a plurality of data signals;
create a plurality of frequency modulated channel signals within a frequency range for the plurality of data signals, wherein each of the plurality of frequency modulated channel signals is associated with a specific frequency band in the frequency range and the frequency range including frequencies from a low frequency to a high frequency, the high frequency is below a harmonic of the low frequency that interferes with the high frequency;
sum the plurality of frequency modulated channel signals into a composite modulated signal;

a downhole transformer coupled to at least one device, the downhole transformer having a first downhole terminal coupled to at least two conductors of the wireline and a second downhole transformer coupled to at least one other conductor of the wireline; and a surface transformer coupled to the surface equipment, the surface equipment having a first surface terminal coupled to at least two conductors and a second surface terminal coupled to at least one other conductor.

15. The system of claim 14 wherein at least two conductors are crosswise paired with opposite conductors.

16. The system of claim 14 wherein the wireline has at least four conductors and at least two conductor pairs are each crosswise paired with opposite conductors.

17. A method comprising:
receiving data from a device in a wellbore;
forming a plurality of frequency modulated channel signals that are each associated with a specific frequency band in a frequency range, wherein the plurality of frequency modulated channels comprises analog signals within the frequency range, the frequency range including frequencies from a low frequency band to a high frequency band and the high frequency band is below a harmonic of said low frequency band that interferes with said high frequency band, wherein the plurality of frequency modulated channel signals further comprises creating a frequency modulated digital signal channel assigned to a frequency band outside the frequency range of the frequency modulated analog signals;
summing the plurality of frequency modulated channel signals into a composite modulated signal; and
transmitting the composite modulated signal to surface equipment.

18. A system comprising:
at least one device within a wellbore, wherein the at least one device comprises a square rooter that converts at least one of the plurality of the data signals in a first voltage range to a signed-square root output signal in a second voltage range, wherein the second voltage range is lower than the first voltage range, wherein the square rooter comprises:
 filtering logic configured to receive at least one of the plurality of data signals and limit the signal bandwidth using a lowpass filter;
 absolute value logic coupled to the filtering logic, the absolute value logic configured to convert the negative voltages of first voltage range into positive voltages;
 offset adjustment logic coupled to the filtering logic and the absolute value logic, the offset adjustment logic configured to adjust a reference voltage for the square rooter to avoid dividing by zero; and
 division logic coupled to the filtering logic, absolute value logic, and the offset adjustment logic, the division logic configured to generate the signed-square root output signals,
configured to:
receive a plurality of data signals;
create a plurality of frequency modulated channel signals within a frequency range for the plurality of data signals, wherein each of the plurality of frequency modulated channel signals is associated with a specific frequency band in the frequency range and the frequency range including frequencies from a low frequency to a high frequency, the high frequency is below a harmonic of the low frequency that interferes with the high frequency; and
sum the plurality of frequency modulated channel signals into a composite modulated signal.

19. A system comprising:
at least one device within a wellbore, wherein at least one device comprises a mixer that sums a plurality of modulated channel signals into the composite modulated signal, wherein the mixer comprises:
 at least one operational amplifier that receives one of the plurality of modulated channel signals from the voltage-controlled oscillator;
 at least one summing operational amplifier to form the composite modulated signal that is the summation of the plurality of modulated channel signals; and
 scaling resistors to preferentially boost certain frequencies to compensate for frequency-dependent line losses, configured to:
receive a plurality of data signals;
create a plurality of frequency modulated channel signals within a frequency range for the plurality of data signals, wherein each of the plurality of frequency modulated channel signals is associated with a specific frequency band in the frequency range and the frequency range including frequencies from a low frequency to a high frequency, the high frequency is below a harmonic of the low frequency that interferes with the high frequency; and
sum the plurality of frequency modulated channel signals into a composite modulated signal.

* * * * *